United States Patent
Ouchi et al.

(10) Patent No.: US 11,883,790 B2
(45) Date of Patent: Jan. 30, 2024

(54) HOLLOW PARTICLES, METHOD FOR PRODUCING SAME, AND USAGE OF SAME

(71) Applicant: SEKISUI KASEI CO., LTD., Osaka (JP)

(72) Inventors: Takuto Ouchi, Osaka (JP); Momoka Noda, Osaka (JP); Yugo Katayama, Osaka (JP); Haruhiko Matsuura, Osaka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 775 days.

(21) Appl. No.: 16/979,389

(22) PCT Filed: Mar. 13, 2019

(86) PCT No.: PCT/JP2019/010223
§ 371 (c)(1),
(2) Date: Sep. 9, 2020

(87) PCT Pub. No.: WO2019/177006
PCT Pub. Date: Sep. 19, 2019

(65) Prior Publication Data
US 2021/0001300 A1    Jan. 7, 2021

(30) Foreign Application Priority Data

Mar. 14, 2018 (JP) ................................. 2018-047048
Aug. 31, 2018 (JP) ................................. 2018-163459

(51) Int. Cl.
| | | |
|---|---|---|
| *B01J 13/18* | (2006.01) | |
| *G02B 1/18* | (2015.01) | |
| *C09D 5/00* | (2006.01) | |
| *C08F 220/32* | (2006.01) | |
| *C09D 7/40* | (2018.01) | |
| *C09D 133/14* | (2006.01) | |
| *F16L 59/02* | (2006.01) | |

(52) U.S. Cl.
CPC ......... *B01J 13/185* (2013.01); *C08F 220/325* (2020.02); *C09D 5/006* (2013.01); *C09D 7/70* (2018.01); *C09D 133/14* (2013.01); *F16L 59/028* (2013.01); *G02B 1/18* (2015.01); *C08F 2800/20* (2013.01)

(58) Field of Classification Search
CPC ... B01J 13/04; B01J 13/06; B01J 13/14; B01J 13/16; B01J 13/18; B01J 13/185; G02B 1/18; C09D 5/006; C08F 220/325
See application file for complete search history.

(56) References Cited

U.S. PATENT DOCUMENTS

| | | |
|---|---|---|
| 4,626,471 A | 12/1986 | Chao |
| 6,593,408 B1 | 7/2003 | Takaki et al. |
| 6,593,417 B1 | 7/2003 | Anderson et al. |
| 6,759,478 B2 | 7/2004 | Anderson et al. |
| 7,005,472 B2 | 2/2006 | Anderson et al. |
| 7,981,511 B2 | 7/2011 | Maenaka et al. |
| 9,725,590 B2 | 8/2017 | Chun et al. |
| 10,774,192 B2* | 9/2020 | Tayagaki .................. C08J 9/32 |
| 2003/0212199 A1 | 11/2003 | Anderson et al. |
| 2004/0225057 A1 | 11/2004 | Anderson et al. |
| 2007/0251422 A1 | 11/2007 | Maenaka et al. |
| 2015/0037535 A1 | 2/2015 | Akimoto et al. |
| 2015/0247033 A1 | 9/2015 | Chun et al. |
| 2015/0297520 A1 | 10/2015 | Kobiki et al. |
| 2017/0114243 A1* | 4/2017 | Katayama ................ B01J 13/14 |
| 2017/0196815 A1 | 7/2017 | Kobiki et al. |
| 2018/0228733 A9 | 8/2018 | Kobiki et al. |
| 2019/0100637 A1 | 4/2019 | Katayama et al. |
| 2019/0209994 A1 | 7/2019 | Katayama et al. |
| 2019/0254976 A1 | 8/2019 | Kobiki et al. |

FOREIGN PATENT DOCUMENTS

| | | |
|---|---|---|
| CN | 1333802 | 1/2002 |
| CN | 1376187 | 10/2002 |
| CN | 101245120 | 8/2008 |
| CN | 103304775 | 9/2013 |
| CN | 104540499 | 4/2015 |
| CN | 104903332 | 9/2015 |
| CN | 105348457 | 2/2016 |
| CN | 106573851 | 4/2017 |
| JP | 2006-63297 | 3/2006 |
| JP | 2006-346553 | 12/2006 |
| JP | 2007-70484 | 3/2007 |
| JP | 2010-32719 | 2/2010 |
| JP | 2010-84017 | 4/2010 |

(Continued)

OTHER PUBLICATIONS

Official Communication issued in International Bureau of WIPO Patent Application No. PCT/JP2019/010223, dated Jun. 18, 2019.
Office Action dated Aug. 15, 2022, in Chinese Patent Application No. 201980018452.3, with English-language translation.
Extended European Search Report dated Oct. 20, 2021 in European Patent Application No. 19767272.8.
Office Action dated Jan. 12, 2022 in corresponding Chinese Patent Application No. 201980018452.3, with English Translation.

*Primary Examiner* — Matthew E. Hoban
(74) *Attorney, Agent, or Firm* — Wenderoth, Lind & Ponack, L.L.P.

(57) ABSTRACT

This invention provides hollow particles having a shell containing at least one layer and having an average particle diameter of 10 to 150 nm, wherein a ratio β between absorbance at 908 $cm^{-1}$ (A908) and absorbance at 1722 $cm^{-1}$ (A1722) in an infrared absorption spectrum obtained by measuring the hollow particles by ATR-FTIR (absorbance ratio β: A908/A1722) is 0.1 or less.

16 Claims, No Drawings

(56) References Cited

FOREIGN PATENT DOCUMENTS

| | | |
|---|---|---|
| JP | 2010-84018 | 4/2010 |
| JP | 2010-285624 | 12/2010 |
| JP | 2017-109898 | 6/2017 |
| JP | 2018-35031 | 3/2018 |
| WO | 01/09259 | 2/2001 |
| WO | 2005/097870 | 10/2005 |
| WO | 2016/014807 | 1/2016 |
| WO | 2016/111314 | 7/2016 |
| WO | WO2016111314 * | 7/2016 |
| WO | 2017/163439 | 9/2017 |
| WO | 2018/051794 | 3/2018 |

* cited by examiner

HOLLOW PARTICLES, METHOD FOR PRODUCING SAME, AND USAGE OF SAME

TECHNICAL FIELD

The present invention relates to hollow particles, a production method for the hollow particles, and use of the hollow particles. More specifically, the present invention relates to hollow particles that are obtained by adjusting the remaining epoxy group amount in the hollow particles and that are not easily deformed even when added to a resin or the like, and relates to a production method for the hollow particles, and use of the hollow particles.

BACKGROUND ART

Particles that have cavities are used as microcapsule particles by incorporating various substances in the cavities. These particles having cavities are also called "hollow particles" and are used as a light-scattering material, a low-reflection material, a heat-insulating material, a low-dielectric-constant material, or the like. These materials are added to, for example, a thermosetting or thermoplastic resin and molded into a plate shape, or added to a UV-curable resin and formed into a film shape, to use them as a light-scattering film, a low-reflection film, a heat-insulating film, a low-dielectric-constant film, or the like.

However, a molded article obtained by adding hollow particles to a thermosetting or thermoplastic resin, followed by molding, or a film obtained by adding hollow particles to a UV-curable resin, had problems in terms of reduction in the mechanical strength of the molded article, in particular, the scratch resistance of the surfaces of the molded article. Techniques for solving these problems have been proposed in JP2010-084017A (PTL 1) and JP2010-084018A (PTL 2). These patent documents disclose hollow particles that are surface-treated with alkoxysilane, and further surface-treated with a silane coupling agent having a radical polymerizable group.

CITATION LIST

Patent Literature

PTL 1: JP2010-0884017A
PTL 2: JP2010-084018A

SUMMARY OF INVENTION

Technical Problem

However, when added to a resin and molded or cured, even the hollow particles of PTL 1 and PTL 2 would sometimes undergo deformation and become unable to maintain the hollow part, thus failing to impart desired physical properties to the resulting molded article or cured article.

Solution to Problem

In view of the above, the present invention provides a method for producing hollow particles having a shell containing at least one layer and having an average particle diameter of 10 to 150 nm,
the method comprising
performing a reaction of at least one epoxy group- or oxetane group-containing radical reactive monomer; and performing a reaction with at least one water-soluble amine compound until the remaining unreacted epoxy group amount is 0.9 mmol/g or less.

The present invention also provides hollow particles having a shell containing at least one layer and having an average particle diameter of 10 to 150 nm,
wherein a ratio β between absorbance at 908 $cm^{-1}$ (A908) and absorbance at 1722 $cm^{-1}$ (A1722) in an infrared absorption spectrum obtained by measuring the hollow particles by ATR-FTIR (absorbance ratio β: A908/A1722) is 0.1 or less.

The present invention further provides the hollow particles mentioned above, having a hollow ratio of 35 volume % or more.

The present invention also provides the hollow particles mentioned above, wherein the at least one layer contains nitrogen and carbon, and wherein a nitrogen abundance ratio N and a carbon abundance ratio C obtained by measuring the hollow particles by XPS satisfy the relationship of $0.01 \leq N/C \leq 0.2$.

The present invention further provides the hollow particles mentioned above, wherein the at least one layer contains a cross-linked copolymer derived from at least one epoxy group- or oxetane group-containing radical reactive monomer and at least one water-soluble amine compound.

The present invention further provides the hollow particles mentioned above, wherein the at least one layer contains a copolymer derived from at least one epoxy group- or oxetane group-containing radical reactive monomer and at least one silyl group-containing radical reactive monomer.

The present invention further provides the hollow particles mentioned above, wherein the epoxy group- or oxetane group-containing radical reactive monomer is selected from p-glycidyl styrene, glycidyl (meth)acrylate, 4-hydroxybutyl (meth)acrylate glycidyl ether, (3-ethyloxetan-3-yl)methyl (meth)acrylate, and 3,4-epoxycyclohexyl methyl (meth)acrylate.

The present invention further provides the hollow particles mentioned above, wherein the water-soluble amine compound is selected from ethylenediamine, diethylenetriamine, dipropylenetriamine, triethylenetetramine, tetraethylenepentamine, dimethylaminopropylamine, diethyl aminopropylamine, dibutylaminopropylamine, hexamethylenediamine, N-aminoethylpiperazine, bis-aminopropylpiperazine, trimethyl hexamethylenediamine, bis-hexamethylenetriamine, dicyandiamide, diacetone acrylamide, polyoxypropylene diamine, 3,3'-dimethyl-4,4'-diaminodicyclohexylmethane, 3-amino-1-cyclohexylamino propane, 4,4'-diaminodicyclohexylmethane, isophorone diamine, 1,3-bis(aminomethyl)cyclohexane, N-dimethylcyclohexylamine, bis(aminomethyl)norbornane, 4,4'-diaminodiphenylmethane (methylenedianiline), 4,4'-diaminodiphenyl ether, diaminodiphenyl sulfone, m-phenylenediamine, 2,4'-toluylenediamine, m-toluylenediamine, o-toluylenediamine, metaxylylenediamine, xylylenediamine, amidoamine, aminopolyamide resin, dimethylaminomethyl phenol, 2,4,6-tri(dimethylaminomethyl)phenol, and tri-2-ethylhexane salt of tri(dimethylaminomethyl)phenol.

The present invention further provides the hollow particles mentioned above, wherein the silyl group-containing radical reactive monomer is selected from vinyltrichlorosilane, vinyltrimethoxysilane, vinyltriethoxysilane, p-styrylmethoxysilane, 3-methacryloxypropyldimethoxysilane, 3-methacryloxypropyltrimethoxysilane, 3-methacryloxypropylmethyldiethoxysilane, 3-methacryloxypropyltriethoxysilane, 8-methacryloxyoctyltriethoxysilane, and 3-acryloxypropyltrimethoxysilane.

The present invention also provides a dispersion liquid containing the hollow particles.

The present invention also provides a coating agent containing the hollow particles.

The present invention also provides a heat-insulating film containing the hollow particles.

The present invention also provides an antireflection film containing the hollow particles, and a substrate with an antireflection film containing the hollow particles.

The present invention also provides a light extraction film containing the hollow particles, and a substrate with a light extraction film containing the hollow particles.

The present invention also provides a low-dielectric-constant film containing the hollow particles.

Advantageous Effects of Invention

The present invention can provide hollow particles capable of preventing their hollow parts from collapsing due to deformation when the hollow particles are added to a resin and molded or cured. The obtained molded article or cured article can have desired physical properties originating from the hollow particles (e.g., low-refractive-index properties).

The present invention according to the following embodiments can provide hollow particles capable of further preventing their hollow parts from collapsing due to deformation.

The cross-linked copolymer is derived from an epoxy group- or oxetane group-containing radical reactive monomer and at least one silyl group-containing radical reactive monomer.

DESCRIPTION OF EMBODIMENTS

Hollow Particles

The hollow particles have a shell containing at least one layer. The layer constituting the shell may consist of a single layer or two or more multiple layers.

The hollow particles have a shell containing at least one layer and have an average particle diameter of 10 to 150 nm, wherein a ratio β between absorbance at 908 cm$^{-1}$ (A908) and absorbance at 1722 cm$^{-1}$ (A1722) in an infrared absorption spectrum obtained by measuring the hollow particles by ATR-FTIR (attenuated total reflection Fourier-transform infrared spectrophotometry) (absorbance ratio β: A908/A1722) is 0.1 or less.

If the absorbance ratio β exceeds 0.1, the shell has insufficient strength due to the presence of unreacted epoxy groups; thus, the hollow part cannot be maintained in the molded article or cured article. The absorbance ratio β can be 0.09 or less, 0.08 or less, 0.07 or less, 0.06 or less, 0.05 or less, 0.03 or less, 0.02 or less, or 0.01 or less. The absorbance ratio β is preferably 0.05 or less, and more preferably 0.02 or less. The lower limit of the absorbance ratio β is preferably 0.0001 or more, and more preferably 0.0005 or more.

The at least one layer contains a cross-linked copolymer derived from at least one epoxy group- or oxetane group-containing radical reactive monomer and at least one water-soluble amine compound. The radical reactive monomer is particularly preferably a monomer having no aromatic ring to provide hollow particles that have a high degree of weather resistance and that can be prevented from undergoing yellowing etc. over time. The radical reactivity can be imparted by, for example, an ethylenically unsaturated group.

In the hollow particles, the at least one layer preferably contains nitrogen and carbon, and preferably has a nitrogen abundance ratio N and a carbon abundance ratio C satisfying the relationship of 0.01≤N/C≤0.2, wherein the nitrogen abundance ratio N and carbon abundance ratio C are obtained by measuring the hollow particles by XPS (X-ray photoelectron spectroscopy). If the N/C is less than 0.01, the crosslinking density is insufficient, which may allow one or more low-molecular binder components to easily enter the hollow interior part. If the N/C exceeds 0.2, the crosslinking density is too high, and pinholes are easily formed, which may allow one or more low-molecular binder components to easily enter the hollow interior part. The N/C is more preferably 0.01 to 0.15, and further preferably 0.01 to 0.1.

In the hollow particles, the at least one layer preferably contains carbon and at least one member selected from silicon, sulfur, and phosphorus, and preferably has an abundance ratio M, which is a total of silicon, sulfur, and phosphorus, and a carbon abundance ratio C satisfying the relationship of 0.001≤M/C≤0.2, wherein the abundance ratio M, which is a total of silicon, sulfur, and phosphorus, and a carbon abundance ratio C are obtained by measuring the hollow particles by XPS. If the M/C is less than 0.001, the particles have insufficient strength and can easily collapse. If the M/C exceeds 0.2, the particles can also collapse. The M/C is more preferably 0.001 to 0.15, and further preferably 0.001 to 0.1.

The at least one layer preferably contains a copolymer derived from an epoxy group- or oxetane group-containing radical reactive monomer and at least one silyl group-containing radical reactive monomer. The cross-linked copolymer is preferably a copolymer obtained by crosslinking with a crosslinkable monomer, such as a polyamine compound, a copolymer of at least one epoxy group- or oxetane group-containing radical reactive monomer and at least one silyl group-containing radical reactive monomer. Epoxy, oxetane, and silyl are also collectively called "non-radical reactive functional groups."

Cross-linked copolymers containing a silicon component derived from silyl groups are also referred to as an "organic-inorganic hybrid vinyl-based resin (Si-containing resin)."

The Si-containing resin is preferably obtained by cross-linking with a crosslinkable monomer, such as a polyamine compound, a copolymer obtained by polymerization or copolymerization of at least one monomer having a radical reactive functional group, such as a vinyl group, a (meth)acryloyl group, an allyl group, a maleoyl group, a fumaroyl group, a styryl group, and a cinnamoyl group. Without the Si-containing resin, the crosslinked structure formed by bonding between silyl groups cannot be obtained, and the strength of the shell can decrease.

Further, the Si-containing resin preferably has a silicon abundance ratio Si and a carbon abundance ratio C satisfying the relationship of 0.001≤Si/C≤0.1 in XPS measurement. If the Si/C is less than 0.001, the crosslinking density is low, which may allow one or more low-molecular binder components to easily enter the hollow interior part. If the Si/C exceeds 0.1, the crosslinking density is too high, and pinholes are easily formed, which may allow one or more low-molecular binder components to easily enter the hollow interior part. The Si/C can be 0.001, 0.002, 0.005, 0.01, 0.02, 0.05, 0.07, or 0.1. The Si/C is more preferably 0.002 to 0.05, and further preferably 0.002 to 0.02.

The hollow particles have an average particle diameter of 10 to 150 nm. Hollow particles with an average particle diameter of less than 10 nm can aggregate with each other; thus, their handling can be difficult. When hollow particles with an average particle diameter of greater than 150 nm are kneaded with a coating agent or a resin, surface unevenness or scattering at the particle interfaces increases, and the hollow particles may become whitened. The average particle diameter can be 10 nm, 30 nm, 50 nm, 70 nm, 100 nm, 120 nm, or 150 nm. The average particle diameter is preferably 30 to 120 nm, and more preferably 30 to 100 nm.

The hollow particles have a hollow ratio of 35 volume % or more. The hollow ratio can be 35 volume %, 40 volume %, 50 volume %, 60 volume %, 70 volume %, or 80 volume %. The hollow ratio is preferably 35 to 80 volume %, and more preferably 35 to 60 volume %. If the hollow ratio is less than 35 volume %, the hollow part is small, and desired properties may not be obtained. If the hollow ratio is 80 volume % or more, the shell is too thin, and the hollow part may not be maintained in the molded article or cured article.

The hollow particles have an epoxy group amount of 0.9 mmol/g or less. If the epoxy group amount is more than 0.9 mmol/g, the strength may not be sufficiently improved. The epoxy group amount can be 0.9 mmol/g, 0.8 mmol/g, 0.7 mmol/g, 0.6 mmol/g, 0.5 mmol/g, 0.4 mmol/g, 0.3 mmol/g, 0.2 mmol/g, or 0.1 mmol/g. The epoxy group amount is preferably 0.9 mmol/g or less, and more preferably 0.6 mmol/g or less.

The hollow particles preferably have a CV value, which is an index for evaluation of monodispersibility, of preferably 30% or less, more preferably 25% or less, and further preferably 20% or less. If the CV value exceeds 30%, the scratch resistance may decrease due to the presence of coarse particles. The CV value can be 30%, 25%, 20%, 15%, 10%, or 5%.

The shell of hollow particles preferably has a minimum number of pinholes. If particles with a shell having many pinholes are used for a member that is required to have adjusted heat conductivity, one or more low-molecular binder components easily enter the hollow interior part. Therefore, if such hollow particles are used for a low-refractive index material, the refractive index may not be sufficiently lowered, and if such hollow particles are used as a heat conductivity adjusting agent, the heat conductivity may not be adjusted.

The at least one layer may be a layer containing phosphorus and/or sulfur. The presence of these atoms in the at least one layer can improve the dispersibility of the hollow particles in a curable resin, and improve the physical strength of the hollow particles. The presence of phosphorus and/or sulfur in the at least one layer can be confirmed by fluorescent X-ray analysis. Phosphorus and/or sulfur may be incorporated by using a phosphorus- and/or sulfur-containing monomer in a vinyl-based resin itself. In particular, it is preferable that phosphorus and/or sulfur be incorporated in the at least one layer by performing surface treatment with a phosphorus- and/or sulfur-containing surface treating agent described below. The shell may be composed of a layer or layers containing phosphorus and/or sulfur entirely, or a layer or layers containing phosphorus and/or sulfur partially. The phosphorus or sulfur content is preferably 0.2 to 5.00% by mass. When the content is less than 0.2% by mass, sufficient scratch resistance may not be imparted to a molded article or a cured article containing the hollow particles. When the content is greater than 5.00% by mass, the dispersibility of the hollow particles in a curable resin may be reduced, and the hardness of a molded article or a cured article becomes too high, and accordingly the scratch resistance may be reduced. The content can be 0.2% by mass, 0.5% by mass, 1.00% by mass, 2.00% by mass, 3.00% by mass, 4.00% by mass, or 5.00% by mass. The content is more preferably 0.2 to 4.00% by mass, and further preferably 0.3 to 3.00% by mass. The at least one layer may contain phosphorus or sulfur, or both. The content of phosphorus and sulfur when both are contained can be 0.2 to 10.0% by mass. The content can be 0.2% by mass, 0.5% by mass, 1.00% by mass, 2.00% by mass, 3.00% by mass, 4.00% by mass, 5.00% by mass, 6.00% by mass, 7.00% by mass, 8.00% by mass, 9.00% by mass, or 10.0% by mass.

Furthermore, the hollow particles preferably have an absorbance ratio α between absorbance at 810 cm$^{-1}$ (A810) and absorbance at 1720 cm$^{-1}$ (A1720) in an infrared absorption spectrum obtained by measuring the hollow particles by ATR-FITR (absorbance ratio α: A810/A1720) of 0.015 to 0.50. The absorbance A810 is absorbance corresponding to an absorption spectrum derived from CH out-of-plane bending vibration of the vinyl group. The absorbance A1720 is absorbance corresponding to an absorption spectrum derived from C=O stretching vibration of the carbonyl group. The absorbance ratio α can be used as an index representing a degree of the amount of radical reactive groups introduced into the hollow particles. Specifically, there is a tendency that the greater the absorbance ratio α is, the larger the amount of radical reactive groups introduced into the particles is. Introduction of radical reactive groups into particles improves the dispersibility of the particles in a curable resin and improves the adhesion of the particles with resin after curing, and a molded article or a cured article having a high degree of scratch resistance is easily obtained. When the absorbance ratio α is less than 0.015, the dispersibility or the adhesion of the hollow particles is reduced, and a molded article or a cured article having a low degree of scratch resistance may be obtained. Basically, a higher absorbance ratio α leads to obtain a molded article or a cured article having a higher degree of scratch resistance. Therefore, the absorbance ratio α is preferably higher. However, when the absorbance ratio is higher than 0.50, the radical reactive groups introduced into the hollow particles can undergo a reaction over time, and may cause aggregation in a dispersion liquid. The absorbance ratio α can be 0.015, 0.020, 0.050, 0.100, 0.200, 0.300, 0.400, or 0.500. The absorbance ratio α is more preferably 0.015 to 0.400, and further preferably 0.020 to 0.300.

The hollow particles of the present invention preferably have a shell formed of at least one layer. The at least one layer preferably contains a layer containing a cross-linked copolymer derived from at least one epoxy group- or oxetane group-containing radical reactive monomer and at least one water-soluble amine compound. The hollow particles preferably have an average particle diameter of 10 to 150 nm, a hollow ratio of 35 volume % or more, and an epoxy group amount of 0.9 mmol/g or less.

(1) Epoxy Group- or Oxetane Group-Containing Radical Reactive Monomer

The at least one epoxy group- or oxetane group-containing radical reactive monomer has an epoxy group or an oxetane group, and a radical reactive functional group.

The radical reactive functional group is not particularly limited as long as it is an ethylenically unsaturated group that reacts in radical polymerization (vinyl group or vinyl group-containing functional group). Examples include a vinyl group, a (meth)acryloyl group, an allyl group, a maleoyl group, a fumaroyl group, a styryl group, a cinnamoyl group, and the like. Among these, a vinyl group, a (meth)acryloyl group, and an allyl group, reactivity of which is easily controllable, are preferable.

The epoxy group or oxetane group is a functional group that reacts with a compound having an amino group, a carboxy group, a chlorosulfone group, a mercapto group, a hydroxy group, an isocyanato group, or the like to form a polymer.

The reactive monomer having a radical reactive functional group and an epoxy group or an oxetane group is not particularly limited. Examples include p-glycidylstyrene, glycidyl (meth)acrylate, 4-hydroxybutyl (meth)acrylate glycidyl ether, (3-ethyloxetan-3-yl)methyl (meth)acrylate, 3,4-epoxycyclohexylmethyl (meth)acrylate, and the like. These monomers may be used alone, or in a combination of two or more.

(2) Water-Soluble Amine Compound

The water-soluble amine compound is an amine compound that is capable of being dissolved in an amount of 10 g or more in 100 g of water at room temperature (about 25° C.).

Examples of water-soluble amine compounds include ethylenediamine and adducts thereof, diethylenetriamine, dipropylenetriamine, triethylenetetramine, tetraethylenepentamine, dimethylaminopropylamine, diethyl aminopropylamine, dibutylaminopropylamine, hexamethylenediamine, modified products thereof, N-aminoethylpiperazine, bis-aminopropylpiperazine, trimethyl hexamethylenediamine, bis-hexamethylenetriamine, dicyandiamide, diacetone acrylamide, various modified aliphatic polyamines, polyoxypropylenediamine, and like aliphatic amines, 3,3'-dimethyl-4,4'-diaminodicyclohexylmethane, 3-amino-1-cyclohexylamino propane, 4,4'-diaminodicyclohexylmethane, isophorone diamine, 1,3-bis(aminomethyl)cyclohexane, N-dimethyl cyclohexylamine, bis(aminomethyl)norbornane, and like alicyclic amines, and modified products thereof.

Examples also include 4,4'-diaminodiphenylmethane (methylenedianiline), 4,4'-diaminodiphenyl ether, diaminodiphenyl sulfone, m-phenylenediamine, 2,4'-toluylenediamine, m-toluylenediamine, o-toluylenediamine, metaxylylenediamine, xylylenediamine, and like aromatic amines, and modified products thereof, other special amine-modified products, amidoamines, aminopolyamide resins, and like polyamidoamines, dimethylaminomethylphenol, 2,4,6-tri(dimethylaminomethyl)phenol, tri-2-ethylhexane salt of tri(dimethylaminomethyl)phenol, and like tertiary amines. These water-soluble amine compounds may be used alone, or in a combination of two or more.

(3) Silyl Group-Containing Radical Reactive Monomer

The at least one silyl group-containing radical reactive monomer has a silyl group and a radical reactive functional group.

The radical reactive functional group is not particularly limited as long as it is an ethylenically unsaturated group that reacts in radical polymerization. Examples include a vinyl group, a (meth)acryloyl group, an allyl group, a maleoyl group, a fumaroyl group, a styryl group, a cinnamoyl group, and the like. Among these, a vinyl group, a (meth)acryloyl group, and an allyl group, reactivity of which is easily controllable, are preferable.

The reactive monomer having a silyl group and a radical reactive functional group is not particularly limited. Examples include vinyltrichlorosilane, vinyltrimethoxysilane, vinyltriethoxysilane, p-styrylmethoxysilane, 3-methacryloxypropyldimethoxysilane, 3-methacryloxypropyltrimethoxysilane, 3-methacryloxypropylmethyldiethoxysilane, 3-methacryloxypropyltriethoxysilane, 8-methacryloxyoctyltriethoxysilane, 3-acryloxypropyltrimethoxysilane, and the like. These monomers may be used alone, or in a combination of two or more.

(4) Cross-Linked Copolymer Derived from Epoxy Group- or Oxetane Group-Containing Radical Reactive Monomer and at Least One Water-Soluble Amine Compound In the cross-linked copolymer, the ratio (mass ratio) of the component derived from the epoxy group- or oxetane group-containing radical reactive monomer and the component derived from the water-soluble amine compound is preferably 1:100 to 0.01. A ratio of the component derived from the water-soluble amine compound of less than 0.01 results in an increase in the amount of unreacted epoxy groups or oxetane groups, and the hollow part may not be formed. A ratio of the component derived from the water-soluble amine compound of more than 100 may interfere with phase separation between the cross-linked copolymer and an organic solvent (non-reactive solvent) or cause coloring of the particles. The ratio can be 1:100, 1:70, 1:50, 1:30, 1:10, 1:5, 1:1, 1:0.1, or 1:0.01. The ratio is more preferably 1:10 to 0.1, and still more preferably 1:5 to 0.1.

(5) Copolymer Derived from Epoxy Group- or Oxetane Group-Containing Radical Reactive Monomer and Silyl Group-Containing Radical Reactive Monomer In the copolymer, the ratio (mass ratio) between the component derived from the epoxy group- or oxetane group-containing radical reactive monomer and the component derived from the silyl group-containing radical reactive monomer is preferably 1:100 to 0.001. When the ratio of the component derived from a silyl group-containing radical reactive monomer is less than 0.001, the shell has low strength, and the hollow particles may collapse, or the hollow particles may not be obtained. When the ratio is greater than 100, the shell is too brittle, and pinholes are easily produced, which may make it difficult to enhance the heat-insulating properties of a film. The ratio can be 1:100, 1:70, 1:50, 1:30, 1:10, 1:5, 1:1, 1:0.1, 1:0.05, 1:0.01, or 1:0.001. A more preferable ratio is 1:10 to 0.001, and an even more preferable ratio is 1:1 to 0.01.

(6) Monofunctional Monomer

A polymer comprising the epoxy group- or oxetane group-containing radical reactive monomer may contain a component derived from a monofunctional monomer having only one reactive functional group. Examples of the monofunctional monomer include styrene, an ester of (meth)acrylic acid and an alcohol having 1 to 25 carbon atoms, and the like.

Examples of the ester of (meth)acrylic acid and an alcohol having 1 to 25 carbon atoms include methyl (meth)acrylate, ethyl (meth)acrylate, propyl (meth)acrylate, n-butyl (meth)acrylate, isobutyl (meth)acrylate, tertiary butyl (meth)acrylate, pentyl (meth)acrylate, (cyclo)hexyl (meth)acrylate, heptyl (meth)acrylate, (iso)octyl (meth)acrylate, nonyl (meth)acrylate, (iso)decyl (meth)acrylate, norbornyl (meth)acrylate, isobornyl (meth)acrylate, adamantyl (meth)acrylate, lauryl (meth)acrylate, tetradecyl (meth)acrylate, (iso)stearyl (meth)acrylate, isobornyl (meth)acrylate, phenoxyethylene glycol (meth)acrylate, phenoxydiethylene glycol (meth)acrylate, 2-ethylhexyl (meth)acrylate, and the like. The monofunctional monomers may be used alone, or in a combination of two or more.

The content of the component derived from the epoxy group- or oxetane group-containing radical reactive monomer and the component derived from the silyl group-containing radical reactive monomer is preferably 10% by mass or more of all the components derived from the reactive monomers. When the content is less than 10% by mass, the hollow particles may not be formed. The content can be 10% by mass, 20% by mass, 30% by mass, 40% by mass, 50% by mass, 60% by mass, 70% by mass, 80% by mass, 90% by mass, or 100% by mass. The content of the component derived from the epoxy group- or oxetane group-containing radical reactive monomer and the component derived from the silyl group-containing radical reactive monomer is more preferably 30% by mass or more, and further preferably 50% by mass or more.

(7) Surface-Treating Agent

The hollow particles may have a surface that has been treated with at least one anionic group-containing compound. To the hollow particles, the surface treated with this compound imparts heat resistance, dispersibility in an organic solvent, and a property of preventing one or more low-molecular binder components from entering the hollow interior part.

The anionic group-containing compound is selected from hydrochloric acid, an organic diacid anhydride, and an oxo acid (for example, inorganic acids such as nitric acid, phosphoric acid, sulfuric acid, and carbonic acid, and organic acids such as a carboxylic acid compound, an alkyl ester compound of sulfuric acid, a sulfonic acid compound, a phosphoric acid ester compound, a phosphonic acid compound, and a phosphinic acid compound). Among these compounds, a compound containing phosphorus and/or sulfur as a constituent component is preferable.

The carboxylic acid compound is not particularly limited as long as it is a compound having a carboxy group. Examples include linear carboxylic acids, such as formic acid, acetic acid, propionic acid, butyric acid, valeric acid, hexanoic acid, heptanoic acid, octanoic acid, nonanoic acid, decanoic acid, dodecanoic acid, tetradecanoic acid, and stearic acid; branched carboxylic acids, such as pivalic acid, 2,2-dimethylbutyric acid, 3,3-dimethylbutyric acid, 2,2-dimethylvaleric acid, 2,2-diethylbutyric acid, 3,3-diethylbutyric acid, 2-ethylhexanoic acid, 2-methylheptanoic acid, 4-methyloctanoic acid, and neodecanoic acid; cyclic carboxylic acids, such as naphthenic acid and cyclohexanedicarboxylic acid; and the like. Among these, linear or branched carboxylic acids having 4 to 20 carbon atoms and the like are preferable to effectively enhance the dispersibility in an organic solvent.

The carboxylic acid compound may also be a carboxylic acid having a radical reactive functional group, such as a vinyl group, a (meth)acryloyl group, an allyl group, a maleoyl group, a fumaroyl group, a styryl group, and a cinnamoyl group. Examples include acrylic acid, methacrylic acid, 2-acryloyloxyethylsuccinic acid, 2-methacryloyloxyethylsuccinic acid, 2-acryloyloxyethylhexahydrophthalic acid, 2-methacryloyloxyethylhexahydrophthalic acid, 2-acryloyloxyethylphthalic acid, 2-methacryloyloxyethylphthalic acid, vinylbenzoic acid, and the like.

Examples of the alkyl ester compound of sulfuric acid include dodecylsulfuric acid and the like.

The sulfonic acid compound is not particularly limited as long as it is a compound containing a sulfo group. Examples include p-toluenesulfonic acid, benzenesulfonic acid, dodecylbenzenesulfonic acid, methylsulfonic acid, ethylsulfonic acid, vinylsulfonic acid, allylsulfonic acid, methallylsulfonic acid, 2-acrylamido-2-methylpropanesulfonic acid, and the like.

The phosphoric acid ester compound is not particularly limited as long as it is an ester compound of phosphoric acid. Examples include dodecylphosphoric acid, as well as polyoxyethylene alkyl ether phosphoric acid represented by the following general formula (a).

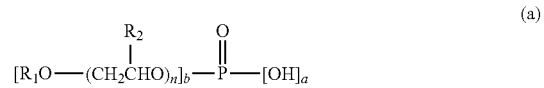

In this formula, $R_1$ is an alkyl group having 4 to 19 carbon atoms, an allyl group ($CH_2=CHCH_2-$), a (meth)acrylic group, or a styryl group. Examples of the alkyl group having 4 to 19 carbon atoms include a butyl group, a pentyl group, an octyl group, a nonyl group, a decyl group, an undecyl group, a dodecyl group, a tridecyl group, and a stearyl group. These groups may be linear or branched. These may be used alone, or in a combination of two or more.

$R_2$ is H or $CH_3$.

n is an addition mole number of alkylene oxide, and is a numerical value in a range necessary for giving an addition mole number of 0 to 30 when the whole is taken as 1 mole.

A combination of a and b is a combination of 1 and 2, or 2 and 1.

It is also possible to use Kayamer PM-21 of Nippon Kayaku Co., Ltd., and the like.

The oxo acid may also be a polymer having an acid group. Examples include, but are not limited to, DISPERBYK 103, DISPERBYK 110, DISPERBYK 118, DISPERBYK 111, DISPERBYK 190, DISPERBYK 194N, and DISPERBYK 2015 (all manufactured by BYK-Chemie GmbH), Solsperse 3000, Solsperse 21000, Solsperse 26000, Solsperse 36000, Solsperse 36600, Solsperse 41000, Solsperse 41090, Solsperse 43000, Solsperse 44000, Solsperse 46000, Solsperse 47000, Solsperse 53095, and Solsperse 55000 (all manufactured by Lubrizol Japan Limited), EFKA4401 and EFKA4550 (all manufactured by Efka Additives B.V.), Floren G-600, Floren G-700, Floren G-900, Floren GW-1500, and Floren GW-1640 (all manufactured by Kyoeisha Chemical Co., LTD.), DISPARLON 1210, DISPARLON 1220, DISPARLON 2100, DISPARLON 2150, DISPARLON 2200, DISPARLON DA-325, and DISPARLON DA-375 (all manufactured by Kusumoto Chemicals, Ltd.), AJISPER PB821, AJISPER PB822, AJISPER PB824, AJISPER PB881, AJISPER PN411, and AJISPER PN411 (all manufactured by Ajinomoto Fine-Techno Co., Inc.), and the like.

The surface treatment may also be performed with a silane-based coupling agent, a titanate-based coupling agent, an aluminate-based coupling agent, a zirconate-based coupling agent, an isocyanate-based compound, or the like, as necessary.

Examples of the silane-based coupling agent include alkoxysilanes, such as methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, octyltriethoxysilane, decyltrimethoxysilane, 1,6-bis(trimethoxysilyl)hexane, and trifluoropropyltrimethoxysilane; silazanes, such as hexamethyldisilazane; chlorosilanes, such as trimethylsilyl chloride; and vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, p-styryltrimethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethylbutylidene)propylamine, N-phenyl-3- aminopropyltrimethoxysilane, tris-(trimethoxysilylpropyl) isocyanurate, 3-ureidopropyltrialkoxysilane, 3-mercaptopropylmethyldimethoxysilane, 3-mercaptopropyltrimethoxysilane, bis(triethoxysilylpropyl) tetrasulfide, 3-isocyanatopropyltriethoxysilane, and the like. In addition to these silane-based coupling agents, examples also include a silane-based coupling agent represented by the following general formula (I).

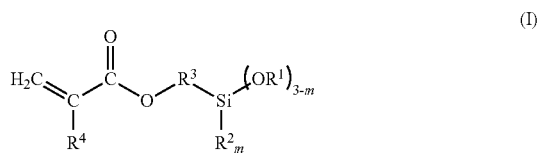

(I)

In general formula (I), $R^1$s each independently represent a substituted or unsubstituted alkyl group having 1 to 6 carbon atoms, a substituted or unsubstituted alkoxyalkyl group having 2 to 4 carbon atoms, or a substituted or unsubstituted phenyl group.

$R^2$s each independently represent a substituted or unsubstituted alkyl group having 1 to 6 carbon atoms, a substituted or unsubstituted alkoxyalkyl group having 2 to 4 carbon atoms, or a substituted or unsubstituted phenyl group.

$R^3$ represents a divalent organic group having 1 to 30 carbon atoms.

$R^4$ represents a hydrogen atom or a methyl group.

m represents an integer of 0 to 2.

Examples of the alkyl group having 1 to 6 carbon atoms represented by $R^1$ or $R^2$ include methyl, ethyl, propyl, butyl, pentyl, and hexyl. These alkyl groups include structural isomers, if possible.

Examples of the alkoxyalkyl group having 2 to 4 carbon atoms represented by $R^1$ or $R^2$ include methoxymethyl, methoxyethyl, ethoxymethyl, methoxybutyl, ethoxyethyl, and butoxymethyl. These alkoxyalkyl groups include structural isomers, if possible.

Examples of the substituents of $R^1$s and $R^2$s include a halogen atom (a fluorine atom, a chlorine atom, a bromine atom, and an iodine atom), a hydroxy group, an amino group, a phenyl group, and the like.

Examples of the divalent organic group having 1 to 30 carbon atoms represented by $R^3$ include methylene, ethylene, trimethylene, tetramethylene, pentamethylene, hexamethylene, heptamethylene, octamethylene, nonamethylene, decamethylene, undecamethylene, dodecamethylene, tridecamethylene, tetradecamethylene, and like alkanediyl groups. The alkanediyl group may have a branched structure substituted with an alkyl group.

Specific examples of the silane-based coupling agent represented by general formula (I) include 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 4-(meth)acryloxybutyltrimethoxysilane, 4-(meth)acryloxybutyltriethoxysilane, 4-(meth)acryloxybutylmethyldimethoxysilane, 4-(meth)acryloxybutylmethyldiethoxysilane, 5-(meth)acryloxypentyltrimethoxysilane, 5-(meth)acryloxypentyltriethoxysilane, 5-(meth)acryloxypentylmethyldimethoxysilane, 5-(meth)acryloxypentylmethyldiethoxysilane, 6-(meth)acryloxyhexyltrimethoxysilane, 6-(meth)acryloxyhexyltriethoxysilane, 6-(meth)acryloxyhexylmethyldimethoxysilane, 6-(meth)acryloxyhexylmethyldiethoxysilane, 7-(meth)acryloxyheptyltrimethoxysilane, 7-(meth)acryloxyheptyltriethoxysilane, 7-(meth)acryloxyheptylmethyldimethoxysilane, and 7-(meth)acryloxyheptylmethyldiethoxysilane.

Examples also include 8-(meth)acryloxyoctyltrimethoxysilane, 8-(meth)acryloxyoctyltriethoxysilane, 8-(meth)acryloxyoctylmethyldimethoxysilane, 8-(meth)acryloxyoctylmethyldiethoxysilane, 9-(meth)acryloxynonyltrimethoxysilane, 9-(meth)acryloxynonyltriethoxysilane, 9-(meth)acryloxynonylmethyldimethoxysilane, 9-(meth)acryloxynonylmethyldiethoxysilane, 10-(meth)acryloxydecyltrimethoxysilane, 10-(meth)acryloxydecyltriethoxysilane, 10-(meth)acryloxydecylmethyldimethoxysilane, 10-(meth)acryloxydecylmethyldiethoxysilane, 11-(meth)acryloxyundecyltrimethoxysilane, 11-(meth)acryloxyundecyltriethoxysilane, 11-(meth)acryloxyundecylmethyldimethoxysilane, 11-(meth)acryloxyundecylmethyldiethoxysilane, 12-(meth)acryloxydodecyltrimethoxysilane, 12-(meth)acryloxydodecyltriethoxysilane, 12-(meth)acryloxydodecylmethyldimethoxysilane, 12-(meth)acryloxydodecylmethyldiethoxysilane, 13-(meth)acryloxytridecyltrimethoxysilane, 13-(meth)acryloxytridecyltriethoxysilane, 13-(meth)acryloxytridecylmethyldimethoxysilane, 13-(meth)acryloxytridecylmethyldiethoxysilane, 14-(meth)acryloxytetradecyltrimethoxysilane, 14-(meth)acryloxytetradecyltriethoxysilane, 14-(meth)acryloxytetradecylmethyldimethoxysilane, 14-(meth)acryloxytetradecylmethyldiethoxysilane, and the like.

The silane-based coupling agent used in the present invention is not limited to these. The silane-based coupling agent is also available from silicone manufacturers, such as Shin-Etsu Chemical Co., Ltd.

Among the silane-based coupling agents mentioned above, 3-methacryloxypropylmethyldimethoxysilane, 3-methacryloxypropyltrimethoxysilane, 3-methacryloxypropylmethyldiethoxysilane, 3-methacryloxypropyltriethoxysilane, 8-methacryloxyoctyltriethoxysilane, and 3-acryloxypropyltrimethoxysilane are preferable.

Examples of the titanate-based coupling agent include PLENACT TTS, PLENACT 46B, PLENACT 55, PLENACT 41B, PLENACT 38S, PLENACT 138S, PLENACT 238S, PLENACT 338X, PLENACT 44, PLENACT 9SA, and PLENACT ET manufactured by Ajinomoto Fine-Techno Co., Inc. The titanate-based coupling agent used in the present invention is not limited to these.

Examples of the aluminate-based coupling agent include PLENACT AL-M manufactured by Ajinomoto Fine-Techno Co., Inc. The aluminate-based coupling agent used in the present invention is not limited to these.

Examples of the zirconate-based coupling agent include ORGATIX ZA-45, ORGATIX ZA-65, ORGATIX ZC-150, ORGATIX ZC-540, ORGATIX ZC-700, ORGATIX ZC-580, ORGATIX ZC-200, ORGATIX ZC-320, ORGATIX ZC-126, and ORGATIX ZC-300 manufactured by Matsumoto Fine Chemical Co., Ltd. The zirconate-based coupling agent used in the present invention is not limited to these.

Examples of the isocyanate-based compound include ethyl isocyanate, propyl isocyanate, isopropyl isocyanate, butyl isocyanate, tert-butyl isocyanate, hexyl isocyanate, dodecyl isocyanate, octadecyl isocyanate, cyclophenyl isocyanate, cyclohexyl isocyanate, benzyl isocyanate, phenyl isocyanate 4-butylphenyl isocyanate, 2-isocyanatoethyl methacrylate, 2-isocyanatoethyl acrylate, and 1,1-(bisacryloyloxymethyl)ethyl isocyanate. The isocyanate-based compound used in the present invention is not limited to these.

These surface treating agents may be used alone, or in a combination of two or more.

(8) Other Additives

The hollow particles may contain other additives, such as pigment particles (pigment), a dye, a stabilizer, an ultraviolet-absorbing agent, an anti-foaming agent, a thickener, a heat stabilizer, a leveling agent, a lubricant, and an antistatic agent, as necessary to such an extent that the effect of the present invention is not inhibited.

The pigment particles are not particularly limited as long as they are pigment particles used in related technical fields. Examples include particles of iron oxide-based pigments such as micaceous iron oxide and iron black; lead oxide-based pigments such as red lead and chrome yellow; titanium oxide-based pigments such as titanium white (rutile-type titanium oxide), titanium yellow, and titanium black; cobalt oxide; zinc oxide-based pigments such as zinc yellow; molybdenum oxide-based pigments such as molybdenum red and molybdenum white; and the like. These pigment particles may be used alone, or in a combination of two or more.

(9) Use of Hollow Particles

The hollow particles are useful as an additive for paint, paper, information recording paper, a heat-insulating film, and a thermoelectric conversion material, for which improvement in scratch resistance is desired. The hollow particles are also useful as an additive for a coating agent (composition for coating) used for a light diffusion film (optical sheet), light guide plate ink, an antireflection film, a light extraction film, or the like; an additive for master pellets for forming a molded article, such as a light diffusion plate and a light guide plate; or an additive for cosmetics.

(a) Coating Agent

A coating agent contains at least the hollow particles. The coating agent may further contain any binder.

The binder is not particularly limited and can be a known binder resin. Examples of the binder resin include a thermosetting resin, a thermoplastic resin, and the like. More specific examples include a fluorine-based resin, a polyamide resin, an acrylic resin, a polyurethane resin, an acrylic urethane resin, a butyral resin, and the like. These binder resins may be used alone, or in a combination of two or more. The binder resin may be a homopolymer of a single reactive monomer or a copolymer of multiple monomers. The binder may also be a reactive monomer.

Examples of the reactive monomer include monofunctional reactive monomers, such as an ester of (meth)acrylic acid and an alcohol having 1 to 25 carbon atoms, such as methyl (meth)acrylate, ethyl (meth)acrylate, propyl (meth) acrylate, n-butyl (meth)acrylate, isobutyl (meth)acrylate, tertiary butyl (meth)acrylate, pentyl (meth)acrylate, (cyclo) hexyl (meth)acrylate, heptyl (meth)acrylate, (iso)octyl (meth)acrylate, nonyl (meth)acrylate, (iso)decyl (meth)acrylate, norbornyl (meth)acrylate, isobornyl (meth)acrylate, adamantyl (meth)acrylate, lauryl (meth)acrylate, tetradecyl (meth)acrylate, (iso)stearyl (meth)acrylate, isobornyl methacrylate, phenoxyethylene glycol (meth)acrylate, phenoxydiethylene glycol (meth)acrylate, and 2-ethylhexyl (meth)acrylate.

Examples also include polyfunctional reactive monomers, such as trimethylolpropane tri(meth)acrylate, tripropylene glycol di(meth)acrylate, diethylene glycol di(meth)acrylate, dipropylene glycol di(meth)acrylate, pentaerythritol tri (meth)acrylate, pentaerythritol tetra(meth)acrylate, dipentaerythritol hexa(meth)acrylate, 1,6-hexanediol di(meth) acrylate neopentyl glycol di(meth)acrylate, trimethylolpropane tri(meth)acrylate, ditrimethylolpropane tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerin tetra(meth)acrylate, adamantyl di(meth)acrylate, isobornyl di(meth)acrylate, dicyclopentane di(meth)acrylate, tricyclodecane di(meth)acrylate, and ditrimethylolpropane tetra(meth)acrylate.

When these reactive monomers are used, a polymerization initiator that initiates a curing reaction by ionizing radiation may be used. Examples include imidazole derivatives, bisimidazole derivatives, N-arylglycine derivatives, organic azide compounds, titanocenes, aluminate complexes, organic peroxides, N-alkoxypyridinium salts, thioxanthone derivatives, and the like.

For example, the binder may also be an inorganic binder, such as a hydrolysate of silicon alkoxide. Examples of silicon alkoxide include tetramethoxysilane, tetraethoxysilane, methyltrimethoxysilane, methyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, vinyltrimethoxysilane, vinyltriethoxysilane, vinyltriacetoxysilane, allyltrimethoxysilane, 3-acryloxypropyltrimethoxysilane, 3-methacryloxypropylmethyldimethoxysilane, 3-methacryloxytrimethoxysilane, 3-methacryloxypropylmethyldiethoxysilane, 3-methacryloxypropyltriethoxysilane, 3-mercaptopropyltrimethoxysilane, 3-mercaptopropylmethyldimethoxysilane, 3-mercaptopropyltriethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2(3,4-epoxycyclohexyl)ethyltrimethoxysilane, 2-(3,4-epoxycyclohexyl)ethyltriethoxysilane, 3-(meth) acryloxypropyltrimethoxysilane, 3-(meth) acryloxypropyltriethoxysilane, 3-ureidopropyltrimethoxysilane, 3-ureidopropyltriethoxysilane, dimethyldimethoxysilane, dimethyldiethoxysilane, diethyldimethoxysilane, and diethyldiethoxysilane.

Examples of known binder products include Dianal LR-102 and Dianal BR-106 manufactured by Mitsubishi Rayon Co., Ltd., and the like.

The content of the hollow particles in the coating agent is appropriately adjusted depending on intended use, and may be 0.1 to 1000 parts by mass based on 100 parts by mass of the binder.

The coating agent usually contains a dispersion medium. The dispersion medium may be water-based or oil-based. Examples of oil-based media include hydrocarbon-based solvents, such as toluene and xylene; ketone-based solvents, such as methyl ethyl ketone and methyl isobutyl ketone; ester-based solvents, such as ethyl acetate and butyl acetate; ether-based solvents, such as dioxane, ethylene glycol diethyl ether, and 1-methoxy-2-propanol; and the like. Examples of water-based media include water and alcohol-based solvents (e.g., isopropyl alcohol). When an oil-based medium is used, it is preferable to use hollow particles that have been surface-treated with the silane-based coupling agent mentioned above, from the viewpoint of an improvement in dispersibility. The silane-based coupling agent is more preferably a compound that is a silane-based coupling agent represented by general formula (I) above, in which $R^3$ is a divalent organic group having a large number of carbon atoms. For example, when a ketone-based solvent such as methyl isobutyl ketone is used as a solvent, it is particularly preferable to use 8-methacryloxyoctyltriethoxysilane.

The coating agent may further contain other additives, such as a curing agent, a coloring agent, an antistatic agent, and a leveling agent.

A substrate to be coated with the coating agent is not particularly limited, and a substrate suitable for use can be used. For example, in an optical use, a transparent substrate, such as a glass substrate or a transparent resin substrate, is used.

(b) Master Pellet

A master pellet contains the hollow particles and a substrate resin.

The substrate resin is not particularly limited as long as it is a usual thermoplastic resin. Examples include a (meth) acrylic resin, an alkyl (meth)acrylate-styrene copolymer resin, a polycarbonate resin, a polyester resin, a polyethylene resin, a polypropylene resin, a polystyrene resin, and the like. When transparency is particularly requested, a (meth) acrylic resin, an alkyl (meth)acrylate-styrene copolymer resin, a polycarbonate resin, and a polyester resin are preferable. These substrate resins may be used alone, or in a combination of two or more. The substrate resin may further contain a trace amount of additives, such as an ultraviolet absorbing agent, a heat stabilizer, a coloring agent, and a filler.

The master pellet can be produced by melt-kneading the hollow particles and the substrate resin, and subjecting the resulting product to a molding method, such as extrusion molding or injection molding. The proportion of the hollow particles in the master pellet is not particularly limited, and is preferably about 0.1 to 60% by mass, more preferably about 0.3 to 30% by mass, and further preferably about 0.4 to 10% by mass. A proportion exceeding 60% by mass can make production of the master pellet difficult. A proportion of less than 0.1% by mass can deteriorate the effect of the present invention.

For the master pellet, a molded article is obtained, for example, by extrusion molding, injection molding, or press molding. Alternatively, the substrate resin may be newly added when molding. The amount of the substrate resin added is preferably adjusted so that the proportion of the hollow particles contained in the finally obtained molded article is about 0.1 to 60% by mass. At the time of molding, it is also possible to add, for example, a trace amount of additives, such as an ultraviolet-absorbing agent, a heat stabilizer, a coloring agent, and a filler.

(c) Cosmetics

Examples of specific cosmetics into which the hollow particles may be incorporated include solid cosmetics, such as face powder and foundation; powdery cosmetics, such as baby powder and body powder; liquid cosmetics, such as skin lotion, milky lotion, cream, and body lotion; and the like.

The proportion of the hollow particles in these cosmetics varies depending on the type of cosmetics. For example, the proportion of the hollow particles in solid cosmetics, such as face powder and foundation, is preferably 1 to 20% by mass, and particularly preferably 3 to 15% by mass. The proportion in powdery cosmetics, such as baby powder and body powder, is preferably 1 to 20% by mass, and particularly preferably 3 to 15% by mass. Furthermore, the proportion in liquid cosmetics, such as skin lotion, milky lotion, cream, liquid foundation, body lotion, and pre-shave lotion, is preferably 1 to 15% by mass, and particularly preferably 3 to 10% by mass.

In order to improve the optical function and the texture, these cosmetics can contain mica, talc, and other inorganic compounds, iron oxide, titanium oxide, ultramarine, Prussian blue, carbon black, and other coloring pigments, azo-based synthetic dyes, and the like. The liquid medium in the liquid cosmetics is not particularly limited, and water, alcohol, hydrocarbon, silicone oil, vegetable or animal fats and oils, and the like can be used. Various functions can be added to these cosmetics by adding a moisturizing agent, an anti-inflammatory agent, a whitening agent, a sunscreen agent, a bactericide, an antiperspirant, a refreshing agent, a flavoring agent, and the like, which is usually used in cosmetics, in addition to the other ingredients.

(d) Heat-Insulating Film

A heat-insulating film contains at least the hollow particles. A film or a sheet-like material that contains the hollow particles has an air part inside the hollow particles, and can thus be used as a heat-insulating film. Since the hollow particles have a small particle diameter, a heat-insulating film having high transparency is obtained. Further, since a binder does not easily enter the hollow interior part, a heat-insulating film having a high degree of heat-insulating properties is easily obtained. Furthermore, since the hollow particles have excellent alkali resistance, a heat-insulating film having excellent alkali resistance is easily obtained. The heat-insulating film can be obtained by applying the coating agent described above to a substrate by a well-known method such as a dipping method, a spraying method, a spin coating method, a spinner method, or a roll coating method; drying the resulting product; and optionally further heating the resulting product, irradiating the resulting product with ultraviolet rays, or firing the resulting product.

(e) Antireflection Film

An antireflection film contains at least the hollow particles. A film or a sheet-like material that contains the hollow particles has a reduced refractive index due to the presence of the air part inside the hollow particles, and can thus be used as an antireflection film. Further, since the hollow particles have a high degree of heat resistance, an antireflection film having high heat resistance is obtained. Furthermore, since the hollow particles have excellent alkali resistance, an antireflection film having excellent alkali resistance is easily obtained. The antireflection film can be obtained by applying the coating agent described above to a substrate by a well-known method such as a dipping method, a spraying method, a spin coating method, a spinner method, or a roll coating method; drying the resulting product; and optionally further heating the resulting product, irradiating the resulting product with ultraviolet rays, or firing the resulting product.

(f) Substrate with Antireflection Film

A substrate with an antireflection film is obtained by forming the above antireflection film on a surface of a substrate. The substrate may be glass; a plastic sheet, a plastic film, a plastic lens, a plastic panel, or the like of polycarbonate, an acrylic resin, PET, TAC, or the like; a cathode ray tube; a fluorescent display tube; a liquid crystal display panel; or the like. Depending on the use, the film is formed on the substrate alone or in combination with a protective film, a hard coat film, a flattening film, a high-refractive-index film, an insulating film, an electrically conductive resin film, an electrically conductive metal fine particle film, an electrically conductive metal oxide fine particle film, other optional films such as a primer film, or the like. When used in combination, the antireflection film does not necessarily have to be formed on the outermost surface.

(g) Light Extraction Film

A light extraction film contains at least the hollow particles. In LED or organic EL illumination, the difference in the refractive index between an air part and a light-emitting layer is significant; thus, emitted light is easily confined inside the element. For this reason, light extraction films are used for the purpose of improving the luminous efficacy. A film or a sheet-like material that contains the hollow particles has a reduced refractive index due to the presence of the air part inside the hollow particles, and can thus be used as a light extraction film. Further, since the hollow particles have a high degree of heat resistance, a light extraction film having high heat resistance is obtained. Furthermore, since the hollow particles have excellent alkali resistance, a light extraction film having excellent alkali resistance is easily obtained. The light extraction film can be obtained by applying the coating agent described above to a substrate by a well-known method such as a dipping method, a spraying method, a spin coating method, a spinner method, or a roll coating method; drying the resulting product; and optionally further heating the resulting product, irradiating the resulting product with ultraviolet rays, or firing the resulting product.

(h) Substrate with Light Extraction Film

A substrate with a light extraction film is obtained by forming the above light extraction film on a surface of a substrate. The substrate may be glass; a plastic sheet, a plastic film, a plastic lens, a plastic panel, or the like of polycarbonate, an acrylic resin, PET, TAC, or the like; a cathode ray tube; a fluorescent display tube; a liquid crystal display panel; or the like. Depending on the use, the film is formed on the substrate alone or in combination with a protective film, a hard coat film, a flattening film, a high-refractive-index film, an insulating film, an electrically conductive resin film, an electrically conductive metal fine particle film, an electrically conductive metal oxide fine particle film, other optional films such as a primer film, or the like. When used in combination, the light extraction film does not necessarily have to be formed on the outermost surface.

(i) Low-Dielectric-Constant Film

A low-dielectric-constant film contains at least the hollow particles. A film or a sheet-like material that contains the hollow particles has an air part inside the hollow particles, and can thus be used as a low-dielectric-constant film. Since the hollow particles have a small particle diameter, a low-dielectric-constant film having high transparency is obtained. Further, since a binder does not easily enter the hollow interior part, a low-dielectric-constant film with low dielectric constant is easily obtained. Furthermore, since the hollow particles have excellent alkali resistance, a low-dielectric-constant film having excellent alkali resistance is easily obtained. The low-dielectric-constant film can be obtained by applying the coating agent described above to a substrate by a well-known method such as a dipping method, a spraying method, a spin coating method, a spinner method, or a roll coating method; drying the resulting product; and optionally further heating the resulting product, irradiating the resulting product with ultraviolet rays, or firing the resulting product.

(10) Method for Producing Hollow Particles

Although not particularly limited, the hollow particles can be produced, for example, by performing a step of preparing polymer particles containing a non-reactive solvent (polymerization step), a step of phase-separating the non-reactive solvent from the polymer particles (phase separation step), and a step of removing the non-reactive solvent (solvent removal step).

In a conventional method for producing hollow particles, a shell is formed by a single polymerization of a reactive monomer. In this method, phase separation between an organic solvent (non-reactive solvent) and the shell is performed simultaneously with the polymerization. The inventors of the present invention assumed that, in this method, the step of simultaneously performing phase separation and polymerization causes generation of pinholes and a reduction in the monodispersibility. The inventors also assumed that pinholes in the shell inhibit reduction in the heat conductivity of a film and reduction in the reflectance of a film when the hollow particles are used as a heat-conductivity-adjusting agent. The inventors then assumed that generation of pinholes can be suppressed, and monodispersibility can be improved, by first forming polymer particles before phase separation of the non-reactive solvent, and then causing phase separation after the formation of the polymer particles.

Specifically, polymer particles are prepared by polymerizing a reactive monomer having a radical reactive functional group and a non-radical reactive functional group, based on one of these functional groups. A non-reactive solvent is incorporated into the polymer particles by mixing with the reactive monomer in advance, or by allowing the polymer particles to absorb the non-reactive solvent after the preparation of the polymer particles. Next, the polymer and the non-reactive solvent are phase-separated by polymerization of the remaining other functional group to give microcapsule particles enclosing the non-reactive solvent. Thereafter, the non-reactive solvent are removed to obtain hollow particles.

In the above, separation of the polymerization and phase separation has the following advantages.

Gaps formed in the conventional production method between polymers of the shell are no longer formed, and generation of pinholes in the shell of the resulting hollow particles can be suppressed.

The shape of the hollow particles depends on the shape and the particle size distribution of polymer particles before phase separation, rather than oil droplets; thus, hollow particles with high monodispersibility are easily obtained.

The production method will be described below.

(A) Polymerization Step

In the polymerization step, polymer particles are prepared by polymerizing a reactive monomer having a radical reactive functional group and a non-radical reactive functional group, based on one of these functional groups. A non-reactive solvent is incorporated into the polymer particles by mixing with the reactive monomer in advance, or by allowing the polymer particles to absorb the non-reactive solvent after the preparation of the polymer particles.

(a) Method for Preparing Polymer Particles

A method for preparing polymer particles may be any method selected from known methods such as a mass polymerization method, a solution polymerization method, a dispersion polymerization method, a suspension polymerization method, and an emulsion polymerization method. Among them, a suspension polymerization method and an emulsion polymerization method by which polymer particles can be relatively simply prepared are preferable. Furthermore, an emulsion polymerization method by which polymer particles having high monodispersibility are easily obtained is more preferable.

Polymer particles are obtained by polymerizing a radical reactive functional group or a non-radical reactive functional group.

It is preferable that polymerization is performed by adding a compound that polymerizes a functional group to be polymerized.

(i) In polymerization of the radical reactive functional group, a polymerization initiator can be used for the compound. Examples of the polymerization initiator include, but are not particularly limited to, persulfates, such as ammonium persulfate, potassium persulfate, and sodium persulfate; organic peroxides, such as cumene hydroperoxide, di-tert-butyl peroxide, dicumyl peroxide, benzoyl peroxide, lauroyl peroxide, dimethylbis(tert-butylperoxy)hexane, dimethylbis(tert-butylperoxy)hexyne-3, bis(tert-butylperoxyisopropyl)benzene, bis(tert-butylperoxy)trimethylcyclohexane, butyl-bis(tert-butylperoxy)valerate, 2-ethylhexaneperoxy acid tert-butyrate, dibenzoyl peroxide, paramenthane hydroperoxide, and tert-butylperoxy benzoate; and azo compounds, such as 2,2'-azobis[2-(2-imidazolin-2-yl)propane]dihydrochloride, 2,2'-azobis[2-(2-imidazolin-2-yl)propane]disulfate dihydrate, 2,2'-azobis(2-amidinopropane) dihydrochloride, 2,2'-azobis[N-(2-carboxyethyl)-2-methylpropionamidine]hydrate, 2,2'-azobis{2-[1-(2-hydroxyethyl)-2-imidazolin-2-yl]propane}dihydrochloride, 2,2'-azobis[2-(2-imidazolin-2-yl)propane], 2,2'-azobis(1-imino-1-pyrrolidino-2-ethylpropane) dihydrochloride, 2,2'-azobis{2-methyl-N-[1,1-bis(hydroxmethyl)-2-hydroxyethyl]propionamide}, 2,2'-azobis[2-methyl-N-(2-hydroxyethyl)propionamide], 4,4'-azobis(4-cyanopentanoic acid), 2,2'-azobisisobutyronitrile, (2,2'-azobis(2-methyl-butyronitrile)), 2,2'-azobis(2-isopropylbutyronitrile), 2,2'-azobis(2,3-dimethylbutyronitrile), 2,2'-azobis(2,4-dimethylbutyronitrile), 2,2'-azobis(2-methylcapronitrile), 2,2'-azobis(2,3,3-trimethylbutyronitrile), 2,2'-azobis(2,4,4-trimethylvaleronitrile), 2,2'-azobis(2,4-dimethylvaleronitrile), 2,2'-azobis(2,4-dimethyl-4-ethoxyvaleronitrile), 2,2'-azobis(2,4-dimethyl-4-n-butoxyvaleronitrile), 2,2'-azobis(4-methoxy-2,4-dimethylvaleronitrile), 2,2'-azobis[N-(2-propenyl)-2-methylpropionamide], 2,2'-azobis(N-butyl-2-methylpropionamide), 2,2'-azobis(N-cyclohexyl-2-methylpropionamide), 1,1'-azobis(1-acetoxy-1-phenylethane), 1,1'-azobis(cyclohexane-1-carbonitrile), dimethyl-2,2'-azobis(2-methylpropionate), dimethyl-2,2'-azobisisobutyrate, dimethyl-2,2'-azobis(2-methylpropionate), 2-(carbamoylazo) isobutyronitrile, and 4,4'-azobis(4-cyanovaleric acid). These polymerization initiators may be used alone, or in a combination of two or more.

The polymerization initiator may also be a redox initiator, which is a combination of a polymerization initiator mentioned above, such as persulfates and organic peroxides, with a reducing agent, such as sodium sulfoxylate formaldehyde, sodium hydrogen sulfite, ammonium hydrogen sulfite, sodium thiosulfate, ammonium thiosulfate, hydrogen peroxide, sodium hydroxymethanesulfinate, L-ascorbic acid and a salt thereof, a cuprous salt, and a ferrous salt.

When the polymerization is emulsion polymerization, the polymerization initiator is preferably a water-soluble polymerization initiator, with which emulsion polymerization can be performed in an aqueous solvent. Examples of the water-soluble polymerization initiator include, but are not particularly limited to, persulfates, such as ammonium persulfate, potassium persulfate, and sodium persulfate; and azo compounds, such as 2,2'-azobis[2-(2-imidazolin-2-yl)propane]dihydrochloride, 2,2'-azobis[2-(2-imidazolin-2-yl)propane]disulfate dihydrate, 2,2'-azobis(2-amidinopropane) dihydrochloride, 2,2'-azobis[N-(2-carboxyethyl)-2-methylpropionamidine]hydrate, 2,2'-azobis{2-[1-(2-hydroxyethyl)-2-imidazolin-2-yl]propane}dihydrochloride, 2,2'-azobis[2-(2-imidazolin-2-yl)propane], 2,2'-azobis(1-imino-1-pyrrolidino-2-ethylpropane) dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)propionamide], and 4,4'-azobis(4-cyanopentanoic acid).

(ii) The polymer particles preferably have an unreacted non-radical reactive functional group in the polymer by first polymerizing a radical reactive functional group. If a non-radical reactive functional group is first polymerized, the non-reactive solvent may not be easily absorbed.

It is preferable that one of the reactive functional groups, i.e., the radical reactive functional group or the non-radical reactive functional group, is polymerized to prepare polymer particles having the other reactive functional group unreacted in the polymer. However, there is no great problem even when a functional group polymerized to produce the polymer is polymerized partially rather than entirely. Moreover, there is no great problem even when the other reactive functional group is partially polymerized together. For example, when a radical reactive functional group of glycidyl methacrylate is polymerized to prepare epoxy group-containing polymer particles, the radical reactive functional groups that are unreacted may remain, or epoxy groups may partially undergo ring opening. (In other words, it is sufficient as long as epoxy groups in an amount sufficient for phase separation remain in the polymer particles.)

The upper limit of the amount of a chain transfer agent used is 50 parts by mass based on 100 parts by mass of the reactive monomer. An amount of more than 50 parts by mass may undesirably inhibit the phase separation between the polymer and non-reactive solvent. The amount of use can be 50 part by mass, 40 part by mass, 30 part by mass, 20 part by mass, 10 part by mass, 5 part by mass, or 1 part by mass.

(iii) A chain transfer agent may be used at the time of polymerization of the reactive monomer. Examples of the chain transfer agent include, but are not particularly limited to, alkyl mercaptans, such as n-hexyl mercaptan, n-octyl mercaptan, t-octyl mercaptan, n-dodecyl mercaptan, and t-dodecyl mercaptan; an α-methylstyrene dimer; phenol-based compounds, such as 2,6-di-t-butyl-4-methylphenol and styrenated phenol; allyl compounds, such as allyl alcohol; and halogenated hydrocarbon compounds, such as dichloromethane, dibromomethane, and carbon tetrachloride. These chain transfer agent may be used alone, or in combination of two or more.

(b) Absorption of Non-Reactive Solvent

A non-reactive solvent can be absorbed into polymer particles at the time of the production of the polymer particles or after the production of the polymer particles. The non-reactive solvent can be absorbed in the presence or absence of a dispersion medium that is non-compatible with the non-reactive solvent. Absorption in the presence of a dispersion medium is preferable to perform more efficient absorption of the non-reactive solvent. When a medium is used in the production of polymer particles, the medium may be directly used as a dispersion medium, or may be dispersed in a dispersion medium after the polymer particles are separated from the medium.

A non-reactive solvent can be absorbed into the polymer particles by adding a non-reactive solvent that is non-compatible with a dispersion medium to the dispersion medium containing the polymer particles, followed by performing stirring or the like for a given time.

Absorption of a non-reactive solvent at the time of production of polymer particles is possible by selecting a dispersion medium and a non-reactive solvent that are suitable for preparing polymer particles. For example, when the polymer particles are prepared by emulsion polymerization in an aqueous solvent, a non-reactive solvent that is non-compatible with water is added to the aqueous solvent in advance. Accordingly, a polymerization of a reactive monomer in this aqueous solvent enables preparation of polymer particles and absorption of the solvent into the polymer particles to be performed simultaneously. When the preparation of the polymer particles and absorption into the polymer particles are simultaneously performed, the time necessary for absorption of the non-reactive solvent can be reduced.

(i) Dispersion Medium

The dispersion medium is not particularly limited as long as it is a liquid substance that does not completely dissolve polymer particles. Examples include water; alcohol, such as ethyl alcohol, methyl alcohol, and isopropyl alcohol; alkanes, such as butane, pentane, hexane, cyclohexane, heptane, decane, and hexadecane; aromatic hydrocarbons, such as toluene and xylene; ester-based solvents, such as ethyl acetate and butyl acetate; ketone-based solvents, such as methyl ethyl ketone and methyl isobutyl ketone; and halogen-based solvents, such as methyl chloride, methylene chloride, chloroform, and carbon tetrachloride. These may be used alone, or in a combination of two or more.

(ii) Non-Reactive Solvent

The non-reactive solvent is not particularly limited as long as it is a liquid substance that is non-compatible with a dispersion medium. The phrase "non-compatible with a dispersion medium" as used herein means that the solubility of the non-reactive solvent in the dispersion medium (at 25° C.) is 10% by mass or less. The solubility can be 10% by mass, 8% by mass, 5% by mass, 3% by mass, or 1% by mass. For example, when water is used as the dispersion medium, examples of a usable non-reactive solvent include butane, pentane, hexane, cyclohexane, heptane, decane, hexadecane, toluene, xylene, ethyl acetate, butyl acetate, methyl ethyl ketone, methyl isobutyl ketone, 1,4-dioxane, methyl chloride, methylene chloride, chloroform, carbon tetrachloride, and the like. These may be used alone, or in a combination of two or more.

The amount of the non-reactive solvent added is not particularly limited, and is 20 to 5000 parts by mass based on 100 parts by mass of the polymer particles. If the amount is less than 20 parts by mass, the resulting hollow particles have a small hollow part, and desired properties may not be obtained. If the amount exceeds 5000 parts by mass, the hollow part is too large, and the resulting hollow particles may have reduced strength. The amount can be 20 parts by mass, 50 parts by mass, 100 parts by mass, 300 parts by mass, 500 parts by mass, 700 parts by mass, 1000 parts by mass, 1500 parts by mass, 3000 parts by mass, 4000 parts by mass, or 5000 parts by mass.

(B) Phase Separation Step

Next, the remaining reactive functional group is polymerized to phase-separate the polymer from the non-reactive solvent. By phase separation, microcapsule particles enclosing the non-reactive solvent are obtained. In the present invention, the term "hollow particles" with the expression "hollow" is intended to encompass not only microcapsule particles having a hollow part containing air, but also microcapsule particles having a hollow part containing the non-reactive solvent and other dispersion media.

A compound that is added in order to polymerize the remaining reactive functional group may be the same compounds as the polymerization initiator for polymerizing the radical reactive functional group and the crosslinking agent for polymerizing the non-radical reactive functional group mentioned above in the "Polymerization Step" section.

To adjust the epoxy group amount to 0.9 mmol/g or less, the crosslinking temperature with the crosslinking agent is preferably 60 to 100° C. A temperature lower than 60° C. may decrease the rate of crosslinking between the epoxy group and the water-soluble amine. A temperature higher than 100° C. may cause hydrolysis of the polymer. The crosslinking temperature can be 60° C., 65° C., 70° C., 75° C., 80° C., 85° C., 90° C., 95° C., or 100° C. The crosslinking temperature is more preferably 70 to 90° C.

After the phase separation step, the remaining unreacted epoxy group amount in the hollow particles is 0.9 mmol/g or less. When the remaining epoxy group amount is within this range, the strength of the hollow particles can be improved. The remaining epoxy group amount can be 0.9 mmol/g, 0.8 mmol/g, 0.7 mmol/g, 0.6 mmol/g, 0.5 mmol/g, 0.4 mmol/g, 0.3 mmol/g, 0.2 mmol/g, 0.1 mmol/g, or 0 mmol/g. The remaining epoxy group amount is preferably 0.9 mmol/g or less, and more preferably 0.6 mmol/g or less. The lower limit of the remaining epoxy group amount is 0.001 mmol/g.

The remaining unreacted epoxy group amount is preferably 15 mol % or less, with respect to the epoxy group amount in the epoxy group- or oxetane group-containing radical reactive monomer. If the amount is more than 15 mol %, the strength of the hollow particles may be insufficiently improved. The remaining unreacted epoxy group amount can be 15 mol %, 13 mol %, 10 mol %, 7 mol %, 5 mol %, 3 mol %, or 0 mol %. The remaining unreacted epoxy group amount is more preferably 15 mol % or less, and further preferably 10 mol % or less. The lower limit of the remaining epoxy group amount is 0 mol %.

(C) Solvent Removal (Replacement) Step

Hollow particles having a hollow part containing air or other solvents can be obtained by removing or replacing the non-reactive solvent enclosed in the microcapsule particles, as necessary. Examples of the method for removing the non-reactive solvent include, but are not particularly limited to, a reduced-pressure drying method and the like. The reduced-pressure drying method may be performed under conditions, for example, at a pressure of 500 Pa or lower at 30 to 200° C. for 30 minutes to 50 hours. The pressure can be 500 Pa, 400 Pa, 300 Pa, 200 Pa, or 100 Pa. The temperature can be 30° C., 50° C., 70° C., 100° C., 130° C., 150° C., 170° C., or 200° C. The time can be 30 minutes, 1 hour, 5 hours, 10 hours, 20 hours, 30 hours, 40 hours, or 50 hours. Alternatively, the non-reactive solvent can be replaced by using a solvent replacement operation. For example, an appropriate dispersion medium is added to the microcapsule particles enclosing the non-reactive solvent, or a dispersion liquid of the particles, and performing stirring or the like to replace the non-reactive solvent inside the microcapsule particles with a dispersion medium. Then, the non-reactive solvent can be replaced by removing any excess non-reactive solvent and dispersion medium by a reduced-pressure drying method, a centrifugation method, an ultrafiltration method, or the like. Solvent replacement may be performed only once, or may be performed multiple times.

The hollow particles may be used as a dispersion liquid of the hollow particles in a solvent, as necessary. For example, the hollow particles may be used in the state of a dispersion liquid of microcapsule particles enclosing the non-reactive solvent, which is obtained after the phase separation step, or may be used as a dispersion liquid in a solvent replaced with another dispersion solvent.

The hollow particles may also be used as a dry powder obtained by drying a dispersion liquid of the hollow particles in a solvent, as necessary. A method of drying the hollow particles is not particularly limited. Examples include a reduced-pressure drying method and the like. The dry powder may contain a dispersion solvent, a non-reactive solvent, and the like that remain without being dried.

(D) Other Steps

The hollow particles can be subjected to surface treatment with an anionic group-containing compound by adding the anionic group-containing compound to the dispersion liquid of the hollow particles after the phase separation step, followed by stirring, or by adding the anionic group-containing compound to the hollow particles after the solvent removal step, followed by mixing. In particular, it is preferable to remove any excess crosslinking agent after the phase separation step, and add the anionic group-containing compound to the dispersion liquid of the hollow particles, followed by stirring. The treatment may be performed under conditions, for example, at 30 to 200° C. for 30 minutes to 50 hours.

The method for producing hollow particles of the present invention is a production method for hollow particles having a shell formed of at least one layer. The at least one layer preferably contains a cross-linked copolymer derived from at least one epoxy group- or oxetane group-containing radical reactive monomer, and at least one water-soluble amine compound. The hollow particles preferably have an average particle diameter of 10 to 150 nm, a hollow ratio of 35 volume % or more, and a remaining unreacted epoxy group amount of 0.9 mmol/g or less.

EXAMPLES

The present invention will be further specifically described below by way of Examples, but the present invention is not limited to these Examples. First, details of various measuring methods used in the Examples are described below.

Epoxy Group Amount: Remaining Epoxy Group Amount

The epoxy group amount in particles after the phase separation step was calculated by reacting epoxy groups and hydrochloric acid, further reacting epoxy groups, unreacted hydrochloric acid, and potassium hydroxide, and quantifying unreacted potassium hydroxide by titration with hydrochloric acid.

The obtained water-toluene dispersion of hollow particles was subjected to ultrafiltration or a solvent replacement method based on centrifugation to replace the solvent with water, and a 10% by mass aqueous dispersion of particles was prepared. 10 g of this aqueous dispersion of particles was placed in a glass container, and 0.5 N hydrochloric acid (15 mL) and 17% by mass calcium chloride aqueous solution (50 mL) were added thereto. While shaking for 2 hours in a thermostatic bath at 70° C., epoxy groups were completely reacted with hydrochloric acid. Subsequently, 20 mL of 0.5 N potassium hydroxide was added and stirred to react with unreacted hydrochloric acid. Immediately after this, unreacted potassium hydroxide was titrated with 0.5 N hydrochloric acid with an automatic titration device. The epoxy group amount in the particles was calculated from the dropped amount of hydrochloric acid required for neutralization according to the following formula:

(Epoxy group amount in particles)=(Molar amount of hydrochloric acid required for epoxy ring opening) (Molar amount of hydrochloric acid required for epoxy ring opening)=(molar amount of 15 mL of 0.5 N hydrochloric acid)−((molar amount of 20 mL of 0.5 N potassium hydroxide)−(molar amount of dropped 0.5 N hydrochloric acid))

The epoxy group amount in the particles after the surface treatment step was calculated by subjecting a dry powder obtained by removing the organic solvent in a vacuum dryer to infrared spectroscopy ATR.

More specifically, a 10% by mass dispersion liquid of surface-treated hollow particles in isopropyl alcohol was dried in a vacuum dryer (pressure: 100 kPa or less) at 90° C. for 4 hours to thus obtain a dry powder. The dry powder was subjected to infrared absorption spectrum (ATR-FTIR) measurement under the following conditions to obtain an infrared absorption spectrum. The absorbance ratio (A908/A1722) was calculated from the obtained infrared absorption spectrum. The absorbances A908 and A1722 were measured by connecting a single-reflection horizontal ATR iD5 manufactured by Nicolet as an ATR accessory to a measuring device sold by Nicolet under the product name Nicolet iS5.

High refractive index crystal: Diamond with ZnSe lens
Incident angle: 42°±1°
Measurement region: 4000 $cm^{-1}$ to 600 $cm^{-1}$
Wavenumber dependence of measurement depth: Not corrected
Number of reflections: 1
Detector: DTGS
KBr resolution: 4 $cm^{-1}$
Integrations: 16
Other points: A process was conducted in which the infrared absorption spectrum measured without contact with the sample was used as a background so as not to be involved in the measurement spectrum. In the ATR method, the intensity of an infrared absorption spectrum obtained by measurement varies depending on the degree of adhesion between a sample and a high refractive index crystal; thus, measurement was performed by applying the maximum load applicable with an ATR accessory to approximately equalize the degree of adhesion.

The infrared absorption spectra obtained under the above conditions were subjected to peak processing to obtain each absorbance.

The absorbance A908 at 908 $cm^{-1}$ in an infrared absorption spectrum corresponds to an absorption spectrum derived from C=O stretching vibration of ketones contained in the particles. The absorbance A908 refers to a maximum absorbance difference between the baseline in an infrared absorption spectrum curve in the region at a wavenumber of 908 $cm^{-1}$±5 $cm^{-1}$ and a straight line, taken as a baseline, connecting the minimum absorption position at 925 $cm^{-1}$±5 $cm^{-1}$ and the minimum absorption position at 890 $cm^{-1}$±5 $cm^{-1}$ (measured absorbance−baseline absorbance). In this absorbance measurement, peak separation was not performed even when another absorption spectrum overlapped at 908 $cm^{-1}$.

The absorbance A1722 at 1722 $cm^{-1}$ in an infrared absorption spectrum corresponds to an absorption spectrum derived from C—O stretching vibration of the epoxy groups contained in the particles.

The absorbance A1722 refers to a maximum absorbance difference between the baseline in an infrared absorption spectrum curve in the region at a wavenumber of 1722 $cm^{-1}$±5 $cm^{-1}$ and a straight line, taken as a baseline, connecting the minimum absorption position at 1765 cm$^{-1}$±5 cm$^{-1}$ and the minimum absorption position at 1655 cm$^{-1}$±5 cm$^{-1}$ (measured absorbance–baseline absorbance). In this absorbance measurement, peak separation was not performed even when another absorption spectrum overlapped at 1722 cm$^{-1}$.

Elemental Analysis of Hollow Particles

Elemental analysis of the hollow particles was performed as follows.

A 10% by mass dispersion liquid of surface-treated hollow particles in isopropyl alcohol was dried in a vacuum dryer (pressure: 100 kPa or less) at 90° C. for 4 hours to thus obtain a dry powder. The nitrogen amount N (atom %), the carbon amount C (atom %), the silicon amount Si (atom %), the sulfur amount S (atom %), and the phosphorus amount P (atom %), all constituting the hollow particles, were measured using a relative sensitivity factor (RSF) with a peak area derived from the is orbital for nitrogen and carbon and from the 2p orbital for silicon, sulfur, and phosphorus, using an X-ray photoelectron spectrometer (XPS), Axis Ultra DLD, manufactured by Kratos Analytical Ltd.

X-ray source: Monochromatic Al-Kα ray
Photoelectric takeoff angle: 90°
Measurement range: 0.3×0.7 mm, rectangular
Beam output: 75 W (15 kV-5 mA)
Measurement energy: 1200-0 eV
Pass energy: 80 eV
Neutralization mechanism: 0 N
Measurement step: 1 eV
Measurement time: 100 ms
Integrations: 4
Vacuum: approx. 4×10$^{-9}$ torr The measured nitrogen amount N and a total amount M, which is a total of the silicon amount Si, the sulfur amount S, and the phosphorus amount P, were each divided by the carbon amount C to calculate (N/C) and (M/C).

Hollow Ratio

The hollow ratio of the hollow particles was measured as follows.

0.5 g of a 10% by mass dispersion liquid of surface-treated hollow particles in isopropyl alcohol, 0.95 g of carboxyl-containing acrylic polymer (ARUFON UC-3510, manufactured by Toagosei Co., Ltd., molecular weight: about 2000), and 0.5 g of methanol were accurately weighed and placed in a glass bottle, and the mixture was mixed evenly in an ultrasonic cleaner. Next, the system was vacuumed overnight at 100 kPa or less in an oven at 90° C., and isopropyl alcohol and methanol contained in the system were completely removed by volatilization. The refractive index of the obtained hollow particle-dispersed polymer was measured using an Abbe refractometer (Atago Co., Ltd.).

The refractive index Np of the hollow nanoparticles was calculated using the Maxwell-Garnett formula. The Maxwell-Garnett formula was solved again using a shell refractive index of the hollow nanoparticles of 1.537, a shell density of 1.27, an air refractive index of 1.00, and an air density of 0, to calculate the volume fraction q of air in the hollow nanoparticles (=hollow ratio).

Maxwell-Garnett formula:

$$(Na^2-Nm^2)/(Na^2+Nm^2)=q(Np^2-Nm^2)/(Np^2+Nm^2)$$

Dispersed Particle Diameter

The particle diameter of the hollow particles dispersed in an organic solvent was measured as follows.

More specifically, a 10% by mass dispersion liquid of hollow particles in isopropyl alcohol was diluted with isopropyl alcohol. The resulting dispersion liquid (adjusted to about 0.1% by mass) was irradiated with laser light, and the intensity of light scattered from the hollow particles dispersed in isopropyl alcohol was measured by changes in microseconds. The detected scattering intensity distribution derived from the hollow particles was fitted to the normal distribution, and a Z average particle diameter of the hollow particles was obtained by a cumulant analysis method for calculating the average particle diameter. The Z average particle diameter was used as the dispersed particle diameter in an organic solvent. The Z average particle diameter was simply measured with a commercially available particle diameter measuring apparatus. In the following Examples and Comparative Examples, the Z average particle diameter was measured using a particle diameter measuring apparatus (product name: Zetasizer Nano ZS) of Malvern Instruments Ltd.

Observation of Particle Shape

The shape of the hollow particles was observed as follows.

A 10% by mass dispersion liquid of surface-treated hollow particles in isopropyl alcohol was dried in a vacuum dryer (pressure: 100 kPa or less) at 90° C. for 4 hours to thus obtain a dry powder. TEM images of the hollow particles were taken at a magnification of about 100000 at an acceleration voltage of 80 kV using a transmission electron microscope (H-7600, manufactured by Hitachi High-Technologies Corporation). The particles were more clearly observed with the use of osmium tetroxide staining etc.

Total Luminous Transmittance and Alkali Resistance of Cured Article

The total luminous transmittance and alkali resistance of a cured article containing hollow particles were measured as follows.

20 parts by mass of a 10% by mass dispersion liquid of surface-treated hollow particles in isopropyl alcohol, 1.9 parts by mass of dipentaerythritol polyacrylate (NK ester A-9570W manufactured by Shin Nakamura Chemical Co., Ltd.), 0.10 parts by mass of photopolymerization initiator (Irgacure 127 manufactured by BASF SE), and 30 parts by mass of methyl isobutyl ketone were mixed to obtain a coating agent. 0.5 ml of the coating agent was applied to an easily adhesive PET substrate (Lumirror U34 manufactured by Toray Industries, Inc., thickness: 100 μm) using an automatic coating device with a No. 2 bar coater (IMC-70F0-C manufactured by Imoto Machinery Co., Ltd., pulling speed: 10 mm/sec), thus obtaining a coating film. The obtained coating film was dried in an oven at 80° C. for 2 minutes and cured by passing through an ultraviolet irradiation apparatus (J-Cure manufactured by JATEC, model: JUC1500, pulling speed: 0.4 m/min, integrated light amount: 2000 mJ/cm$^2$) two times to thus produce a cured article containing hollow particles.

The total luminous transmittance of the cured article was measured according to the following procedure according to the method described in JIS K7361-1:1997 "Plastics—Determination of the total luminous transmittance of transparent materials—Part 1: Single beam instrument." More specifically, the individual haze of the produced cured article containing the hollow particles was measured by using the double beam method at a D65 light source using a haze meter (model: HM-150 manufactured by Murakami Color Research Laboratory Co., Ltd.) after stabilizing the light source of the apparatus. The stabilization was confirmed by measurement 30 minutes after the initiation of the light source. The test was performed twice, and the average of the two values of individual total luminous transmittance was considered to be a total luminous transmittance. The total luminous transmittance of Lumirror U34 alone was 92.2%.

To confirm the alkali resistance of the cured article, a few drops of an aqueous sodium hydroxide solution with an adjusted pH of 13 were added to the cured article containing the hollow particles, and the resulting product was allowed to stand for 30 minutes, followed by washing with tap water. The surface of the cured article on which sodium hydroxide was added dropwise was visually observed to evaluate alkali resistance according to the following criteria.

Evaluation Criteria
A: No difference in appearance from the surroundings
B: Discolored
C: Cracking or peeling was observed in the cured article

Example 1

(1) 1440 parts by mass of ion-exchanged water, 2.4 parts by mass of sodium p-styrenesulfonate, 0.8 parts by mass of potassium persulfate were placed in a 2-L reactor equipped with a stirrer and thermometer, and the mixture was heated to 70° C. Then, the inside of the reactor was purged with nitrogen to create a nitrogen atmosphere. 70.4 parts by mass of glycidyl methacrylate, 9.6 parts by mass of 3-methacryloxypropyltriethoxysilane, 1.6 parts by mass of n-octylmercaptan, and 80 parts by mass of toluene were mixed, and the mixed solution was subjected to ultrasonic irradiation for 10 minutes (internal ultrasonic homogenizer, model: Sonifier450 manufactured by Branson) for forced emulsification. Then, emulsion polymerization was performed in a reactor heated to 70° C. for 2 hours while stirring. At this stage, a large number of epoxy groups remained in the particles.

Then, in order to polymerize the remaining epoxy groups, 40 parts by mass of ethylenediamine was added, and polymerization was performed at 80° C. for 16 hours. The reaction of the epoxy groups in the polymer with amine caused phase separation between the polymer and toluene, and hollow particles were prepared. 2000 parts by mass of a dispersion liquid of the hollow particles was subjected to cross-flow washing with 20000 parts by mass of ion-exchanged water using a ceramic filter with a fine pore diameter of 50 nm, and excess ethylenediamine was removed. Then, concentration or addition of ion-exchanged water was appropriately performed to achieve a solids content of 10% by mass, thus obtaining a 10% by mass dispersion liquid of the hollow particles in water. The remaining epoxy group amount after the phase separation step was 0.73 mmol/g.

(2) After 10 parts by mass of dodecylposphoric acid was dissolved in 500 parts by mass of isopropyl alcohol, 500 parts by mass of the 10% by mass dispersion liquid of the hollow particles in water was added, and the mixture was stirred for 30 minutes using an internal ultrasonic homogenizer, thus obtaining a dispersion liquid of surface-treated hollow particles. Then, the dispersion liquid of surface-treated hollow particles was subjected to cross-flow washing with 5000 parts by mass of isopropyl alcohol, and concentration or addition of isopropyl alcohol was appropriately performed to achieve a solids content of 10% by mass, thus obtaining a 10% by mass dispersion liquid of hollow particles in isopropyl alcohol. 50 parts by mass of 3-methacryloxypropyltrimethoxysilane was added to 500 parts by mass of the 10% by mass dispersion liquid of hollow particles in isopropyl alcohol, and the mixture was stirred at 70° C. for 10 hours, thus obtaining a dispersion liquid of hollow particles with a reactive group introduced therein. The dispersion liquid of surface-treated hollow particles was subjected to cross-flow washing with 5000 parts by mass of isopropyl alcohol, and isopropyl alcohol was added to achieve a solid content of 10% by mass, thus obtaining a 10% by mass dispersion liquid of surface-treated hollow particles in isopropyl alcohol.

The obtained particles were dried and observed under a transmission electron microscope, which revealed that spherical particles with a hollow interior were obtained. The hollow particles dispersed in isopropyl alcohol had a diameter of 102 nm, and a hollow ratio of 36 volume %. Regarding the remaining unreacted epoxy group amount in the hollow particles in isopropyl alcohol, the absorbance ratio β was 0.011. The total luminous transmittance of the cured article containing the hollow particles was as high as 94.4%. This is believed to be because a small amount of epoxy groups remained, the particles thus did not undergo deformation in the cured article, the hollow part was maintained, the refractive index of the cured article was reduced, and light was prevented from reflecting on the surface. After the alkali resistance test, the cured article containing the hollow particles had excellent alkali resistance, showing no difference in appearance from the surroundings. The elemental analysis results of the hollow particles revealed that the (N/C) was 0.03, and the (M/C) was 0.03.

Example 2

A dispersion liquid of hollow particles in isopropyl alcohol was obtained in the same manner as in Example 1, except that the polymerization temperature after the addition of ethylenediamine was 70° C., and the polymerization time was 40 hours. The remaining epoxy group amount after the phase separation step was 0.45 mmol/g. The obtained particles were observed under a transmission electron microscope, which revealed that spherical particles with a hollow interior were obtained. The hollow particles dispersed in isopropyl alcohol had a diameter of 103 nm, and a hollow ratio of 42 volume %. The remaining unreacted epoxy group amount in the hollow particles in isopropyl alcohol was 0.006. The total luminous transmittance of the cured article containing the hollow particles was as high as 95.0%. After the alkali resistance test, the cured article containing the hollow particles had excellent alkali resistance, showing no difference in appearance from the surroundings.

Example 3

A dispersion liquid of hollow particles in isopropyl alcohol was obtained in the same manner as in Example 2, except that ethylenediamine was changed to diethylenetriamine. The remaining epoxy group amount after the phase separation step was 0.62 mmol/g. The obtained particles were observed under a transmission electron microscope, which revealed that spherical particles with a hollow interior were obtained. The hollow particles dispersed in isopropyl alcohol had a diameter of 106 nm, and a hollow ratio of 44 volume %. The remaining unreacted epoxy group amount in the hollow particles in isopropyl alcohol was 0.009. The total luminous transmittance of the cured article containing the hollow particles was as high as 95.1%. After the alkali resistance test, the cured article containing the hollow particles had excellent alkali resistance, showing no difference in appearance from the surroundings.

Example 4

A dispersion of hollow particle in isopropyl alcohol was obtained in the same manner as in Example 1, except that ethylenediamine was changed to triethylenetetramine, and the crosslinking time was 40 hours. The remaining epoxy group amount after the phase separation step was 0.34 mmol/g. The obtained particles were observed under a transmission electron microscope, which revealed that spherical particles with a hollow interior were obtained. The hollow particles dispersed in isopropyl alcohol had a diameter of 107 nm, and a hollow ratio of 42 volume %. The remaining unreacted epoxy group amount in the hollow particles in isopropyl alcohol was 0.005. The total luminous transmittance of the cured article containing the hollow particles was as high as 95.0%. After the alkali resistance test, the cured article containing the hollow particles had excellent alkali resistance, showing no difference in appearance from the surroundings.

Comparative Example 1

A dispersion liquid of hollow particle in isopropyl alcohol was obtained in the same manner as in Example 1, except that the polymerization temperature after the addition of ethylenediamine was 70° C., and the polymerization time was 3 hours. The remaining epoxy group amount after the phase separation step was 2.1 mmol/g. Observation under a transmission electron microscope revealed collapse of the hollow part of the obtained particles. Regarding the remaining unreacted epoxy group amount in the hollow particles in isopropyl alcohol, the absorbance ratio β was 0.124. The total luminous transmittance of the cured article containing the hollow particles was as low as 92.3%. This is believed to be because a large amount of epoxy groups remained, the particles thus underwent deformation in the cured article, and the hollow part could not be maintained.

Table 1 below summarizes raw materials used in producing the hollow particles and physical properties.

photopolymerization initiator (IRGACURE 1173 manufactured by BASF SE) were mixed, and the mixture was forcibly stirred for 5 minutes using an ultrasonic homogenizer to obtain a coating agent. 0.5 ml of the coating agent was added dropwise to a slide glass (S1111 manufactured by Matsunami Glass Ind., Ltd.) and applied with a spin coater (Model K-359SD1 manufactured by Kyowa Riken Co., Ltd.) to obtain a coating film. The resulting coating film was dried at room temperature (about 25° C.) and under ambient pressure. The dried coating film was cured by passing through an ultraviolet irradiation apparatus (J-Cure manufactured by JATEC, Model JUC1500, pulling speed: 0.4 m/min, integrated light amount: 2000 mJ/cm$^2$) two times, and thereby a substrate with an antireflection film, in which an antireflection film was formed on a glass substrate, was prepared.

Example 6: Light Extraction Film and Substrate with Light Extraction Film 20 parts by mass of the 10% by mass dispersion liquid of surface-treated hollow particles in isopropyl alcohol prepared in Example 1, 4 parts by mass of dipentaerythritol polyacrylate (NK Ester A-DPH manufactured by Shin-Nakamura Chemical Co., Ltd.), and 0.20 parts by mass of a photopolymerization initiator (IRGACURE 1173 manufactured by BASF SE) were mixed, and the mixture was forcibly stirred for 5 minutes using an ultrasonic homogenizer to obtain a coating agent. 0.5 ml of the coating agent was added dropwise to a slide glass (S1111 manufactured by Matsunami Glass Ind., Ltd.) and applied with a spin coater (Model K-359SD1 manufactured by Kyowa Riken Co., Ltd.) to obtain a coating film. The resulting coating film was dried at room temperature (about 25° C.) and under ambient pressure. The dried coating film was cured by passing

TABLE 1

|  |  | Ex. | | | | Comp. Ex. |
| --- | --- | --- | --- | --- | --- | --- |
|  | Unit | 1 | 2 | 3 | 4 | 1 |
| Type of crosslinking agent |  | Ethylenediamine | Diethylenetriamine | Triethylenetetramine | Ethylenediamine |
| Crosslinking temperature | ° C. | 80 | 70 | 70 | 80 | 70 |
| Crosslinking time | h | 16 | 40 | 40 | 40 | 3 |
| Remaining unreacted epoxy group amount after phase separation step | mmol/g | 0.73 | 0.45 | 0.62 | 0.34 | 2.1 |
| Remaining unreacted epoxy group amount after surface treatment step | — absorbance ratio | 0.011 | 0.006 | 0.009 | 0.005 | 0.124 |
| Dispersed particle diameter | nm | 102 | 103 | 106 | 107 | 104 |
| Hollow ratio | volume % | 36 | 42 | 44 | 42 | 4 |
| Shape of hollow particles |  | Spherical | | | | Collapsed |
| Total luminous transmittance of cured article | % | 94.2 | 95.0 | 95.1 | 95.0 | 92.3 |
| Alkali resistance |  | A | A | A | A | — |

Table 1 reveals that spherical hollow particles that are not easily deformed even when added to a resin or the like can be produced when a small amount of epoxy groups remains.

Example 5: Antireflection Film and Substrate with Antireflection Film 20 parts by mass of the 10% by mass dispersion liquid of surface-treated hollow particles in isopropyl alcohol prepared in Example 1, 4 parts by mass of dipentaerythritol polyacrylate (NK Ester A-DPH manufactured by Shin-Nakamura Chemical Co., Ltd.), and 0.20 parts by mass of a through an ultraviolet irradiation apparatus (J-Cure manufactured by JATEC, Model JUC1500, pulling speed: 0.4 m/min, integrated light amount: 2000 mJ/cm$^2$) two times, and thereby a substrate with a light extraction film, in which a light extraction film was formed on a glass substrate, was prepared.

Example 7: Light Guide Plate Ink and Light Guide Plate

The 10% by mass dispersion liquid of surface-treated hollow particles in isopropyl alcohol prepared in Example 1 was washed with methyl ethyl ketone three times to obtain a 10% by mass dispersion liquid of hollow particles in methyl ethyl ketone. 45 parts by mass of the 10% by mass dispersion liquid of hollow particles in methyl ethyl ketone, 10 parts by mass of an acrylic-based resin (Acrydic A-181 manufactured by DIC Corporation, solids content: 45%), and 1.0 part by mass of a polyether phosphoric acid ester-based surfactant (Solsperse 41000 manufactured by Lubrizol Japan Limited) were mixed to obtain a light diffusing composition (light guide plate ink).

The light-diffusing composition was screen-printed on a 5-inch transparent acrylic plate so that the dot pitch was 500 μm and the dot diameter was 50 μm to obtain a light guide plate.

Example 8: Low-Dielectric-Constant Film 20 parts by mass of the 10% by mass dispersion liquid of surface-treated hollow particles in isopropyl alcohol prepared in Example 1, 4 parts by mass of dipentaerythritol polyacrylate (NK Ester A-9570W manufactured by Shin-Nakamura Chemical Co., Ltd.), and 0.20 parts by mass of a photopolymerization initiator (IRGACURE 1173 manufactured by BASF SE) were mixed, and the mixture was forcibly stirred for 5 minutes using an ultrasonic homogenizer to obtain a coating agent. 0.5 ml of the coating agent was added dropwise to a slide glass (S1111 manufactured by Matsunami Glass Ind., Ltd.) and applied with a spin coater (Model K-359SD1 manufactured by Kyowa Riken Co., Ltd.) to obtain a coating film. The resulting coating film was dried at room temperature (about 25° C.) and under ambient pressure. The dried coating film was cured by passing through an ultraviolet irradiation apparatus (J-Cure manufactured by JATEC, Model JUC1500, pulling speed: 0.4 m/min, integrated light amount: 2000 mJ/cm$^2$) two times, and thereby a low-dielectric-constant film on a glass substrate was prepared.

The invention claimed is:

1. Hollow particles having a shell containing at least one layer and having an average particle diameter of 10 to 150 nm,
    wherein a ratio β between absorbance at 908 cm$^{-1}$ (A908) and absorbance at 1722 cm$^{-1}$ (A1722) in an infrared absorption spectrum obtained by measuring the hollow particles by ATR-FTIR (absorbance ratio (3: A908/A1722) is 0.02 or less.

2. The hollow particles according to claim 1, having a hollow ratio of 35 volume % or more.

3. The hollow particles according to claim 1, wherein the at least one layer contains nitrogen and carbon, and wherein a nitrogen abundance ratio N and a carbon abundance ratio C obtained by measuring the hollow particles by XPS satisfy the relationship of 0.01≤N/C≤0.2.

4. The hollow particles according to claim 1, wherein the at least one layer contains a cross-linked copolymer derived from at least one epoxy group- or oxetane group-containing radical reactive monomer and at least one water-soluble amine compound.

5. The hollow particles according to claim 1, wherein the at least one layer contains a copolymer derived from at least one epoxy group- or oxetane group-containing radical reactive monomer and at least one silyl group-containing radical reactive monomer.

6. The hollow particles according to claim 4, wherein the epoxy group- or oxetane group-containing radical reactive monomer is selected from p-glycidyl styrene, glycidyl (meth)acrylate, 4-hydroxybutyl (meth)acrylate glycidyl ether, (3-ethyloxetan-3-yl)methyl (meth)acrylate, and 3,4-epoxycyclohexyl methyl (meth)acrylate.

7. The hollow particles according to claim 4, wherein the water-soluble amine compound is selected from ethylenediamine, diethylenetriamine, dipropylenetriamine, triethylenetetramine, tetraethylenepentamine, dimethylaminopropylamine, diethylaminopropylamine, dibutylaminopropylamine, hexamethylenediamine, N-aminoethylpiperazine, bis-aminopropylpiperazine, trimethyl hexamethylenediamine, bis-hexamethylenetriamine, dicyandiamide, diacetone acrylamide, polyoxypropylene diamine, 3,3'-dimethyl-4,4'-diaminodicyclohexylmethane, 3-amino-1-cyclohexylamino propane, 4,4'-diaminodicyclohexylmethane, isophorone diamine, 1,3-bis(aminomethyl) cyclohexane, N-dimethylcyclohexylamine, bis(aminomethyl)norbornane, 4,4'-diaminodiphenylmethane (methylenedianiline), 4,4'-diaminodiphenyl ether, diaminodiphenyl sulfone, m-phenylenediamine, 2,4'-toluylenediamine, m-toluylenediamine, o-toluylenediamine, metaxylylenediamine, xylylenediamine, amidoamine, aminopolyamide resin, dimethylaminomethyl phenol, 2,4,6-tri(dimethylaminomethyl)phenol, and tri-2-ethylhexane salt of tri(dimethylaminomethyl)phenol.

8. The hollow particles according to claim 5, wherein the silyl group-containing radical reactive monomer is selected from vinyltrichlorosilane, vinyltrimethoxysilane, vinyltriethoxysilane, p-styrylmethoxysilane, 3-methacryloxypropyldimethoxysilane, 3-methacryloxypropyltrimethoxysilane, 3-methacryloxypropylmethyldiethoxysilane, 3-methacryloxypropyltriethoxysilane, 8-methacryloxyoctyltriethoxysilane, and 3-acryloxypropyltrimethoxysilane.

9. A dispersion liquid containing the hollow particles of claim 1.

10. A coating agent containing the hollow particles of claim 1.

11. A heat-insulating film containing the hollow particles of claim 1.

12. An antireflection film comprising the hollow particles of claim 1.

13. A light extraction film comprising the hollow particles of claim 1.

14. A low-dielectric-constant film containing the hollow particles of claim 1.

15. A substrate with the antireflection film of claim 12, comprising:
    a substrate; and
    the antireflection film formed on a surface of the substrate.

16. A substrate with the light extraction film of claim 13, comprising:
    a substrate; and
    the light extraction formed on a surface of the substrate.

* * * * *